United States Patent [19]

Hanyu et al.

[11] Patent Number: 5,422,749
[45] Date of Patent: Jun. 6, 1995

[54] FERROELECTRIC SMETIC LIQUID CRYSTAL DEVICE

[75] Inventors: Yukio Hanyu, Isehara; Junichiro Kanbe, Yokohama; Hideyuki Sugioka, Ayase; Yutaka Inaba, Kawaguchi; Masanobu Asaoka, Yokohama, all of Japan

[73] Assignee: Canon Kabushiki Kaisha, Tokyo, Japan

[21] Appl. No.: 55,270

[22] Filed: May 3, 1993

Related U.S. Application Data

[60] Continuation-in-part of Ser. No. 998,817, Dec. 30, 1992, abandoned, and a continuation-in-part of Ser. No. 899,161, Jun. 15, 1992, Pat. No. 5,268,780, which is a continuation of Ser. No. 519,916, May 7, 1990, abandoned, said Ser. No. 998,817, is a division of Ser. No. 495,607, Mar. 19, 1990, Pat. No. 5,200,848, which is a division of Ser. No. 245,644, Sep. 16, 1988, Pat. No. 4,932,758.

[30] Foreign Application Priority Data

| Sep. 17, 1987 | [JP] | Japan | 62-234357 |
| Sep. 18, 1987 | [JP] | Japan | 62-232502 |
| Sep. 7, 1988 | [JP] | Japan | 63-225049 |
| May 11, 1989 | [JP] | Japan | 1-119605 |
| May 11, 1989 | [JP] | Japan | 1-119606 |
| May 11, 1989 | [JP] | Japan | 1-119607 |
| May 11, 1989 | [JP] | Japan | 1-119608 |
| May 11, 1989 | [JP] | Japan | 1-119609 |
| May 11, 1989 | [JP] | Japan | 1-119610 |
| May 11, 1989 | [JP] | Japan | 1-119611 |
| May 11, 1989 | [JP] | Japan | 1-119612 |
| Apr. 17, 1990 | [JP] | Japan | 2-100769 |

[51] Int. Cl.⁶ .......................................... G02F 1/1337
[52] U.S. Cl. ............................. 359/76; 359/78; 359/100; 428/1
[58] Field of Search ............. 359/75, 78, 100, 76; 428/1

[56] References Cited

U.S. PATENT DOCUMENTS

Re. 33,342  9/1990  Kohtoh et al. .................. 359/75
3,864,021  3/1976  Katagiri et al. .................. 359/75

(List continued on next page.)

FOREIGN PATENT DOCUMENTS

| 0179592 | 4/1986 | European Pat. Off. . |
| 0231781 | 8/1987 | European Pat. Off. . |
| 107216 | 8/1981 | Japan . |
| 169729 | 10/1982 | Japan . |
| 67832 | 4/1986 | Japan . |
| 003632 | 1/1989 | Japan . |
| 2174399 | 11/1986 | United Kingdom . |
| 0006020 | 10/1987 | WIPO . |

OTHER PUBLICATIONS

Switching Characteristic of SSFLC, Preprint for Liquid Crystal Forum (Oct. 1987) 142:3.
J. App. Phys., vol. 59, No. 7 (1986) 2355:60.

Primary Examiner—William L. Sikes
Assistant Examiner—Huy Mai
Attorney, Agent, or Firm—Fitzpatrick, Cella, Harper & Scinto

[57] ABSTRACT

A liquid crystal device is constituted by a pair of substrates; an alignment film comprising a polyimide which has a fluorine-containing substituent in its carboxylic acid-originated moiety, disposed on at least one of the pair of substrates and subjected to an aligning treatment; and a chiral smectic liquid crystal disposed between the pair of substrates in an alignment state where its helical structure is suppressed. The chiral smectic liquid crystal is placed in an alignment state of forming an aligned region occupying an area which is at least 95% of the effective display region of the liquid crystal device. The aligned region includes a plurality of unidirectionally bent layers each organized by plural liquid crystal molecules in chiral smectic phase.

9 Claims, 18 Drawing Sheets

U.S. PATENT DOCUMENTS

| | | | |
|---|---|---|---|
| 4,367,924 | 1/1983 | Clark et al. | 350/334 |
| 4,561,726 | 12/1985 | Goodby et al. | 350/341 |
| 4,634,228 | 1/1987 | Inasaki et al. | 428/1 |
| 4,639,089 | 1/1987 | Okada et al. | 350/341 |
| 4,674,839 | 6/1987 | Tsuboyama et al. | 350/337 X |
| 4,707,079 | 11/1987 | Inoue | 350/334 |
| 4,709,994 | 12/1987 | Kanbe et al. | 350/350 S |
| 4,728,176 | 3/1988 | Tsuboyama et al. | 350/350 S |
| 4,735,492 | 4/1988 | Sekine et al. | 350/341 |
| 4,778,259 | 10/1988 | Kitayama et al. | 350/350 S |
| 4,781,439 | 11/1988 | Yokokura et al. | 350/341 |
| 4,783,148 | 11/1988 | Tsuboyama et al. | 350/341 |
| 4,796,979 | 1/1989 | Tsuboyama et al. | 350/350 S |
| 4,796,980 | 1/1989 | Kaneko et al. | 350/350 S |
| 4,820,026 | 4/1989 | Okada et al. | 350/341 |
| 4,832,462 | 5/1989 | Clark et al. | 350/350 S |
| 4,879,059 | 11/1989 | Hanyu et al. | 350/341 |
| 4,883,344 | 11/1989 | Okada et al. | 350/339 |
| 4,932,757 | 6/1990 | Hanyu et al. | 350/339 |
| 4,932,758 | 6/1990 | Hanyu et al. | 350/350 S |
| 4,939,003 | 7/1990 | Aoki et al. | 359/75 |
| 5,046,822 | 9/1991 | Matsuda et al. | 428/1 |
| 5,129,727 | 7/1992 | Hanyu et al. | 359/75 |
| 5,192,596 | 3/1993 | Hanyu et al. | 359/78 |
| 5,200,848 | 4/1993 | Hanyu et al. | 428/1 |
| 5,268,780 | 12/1993 | Hanyu et al. | 359/75 |

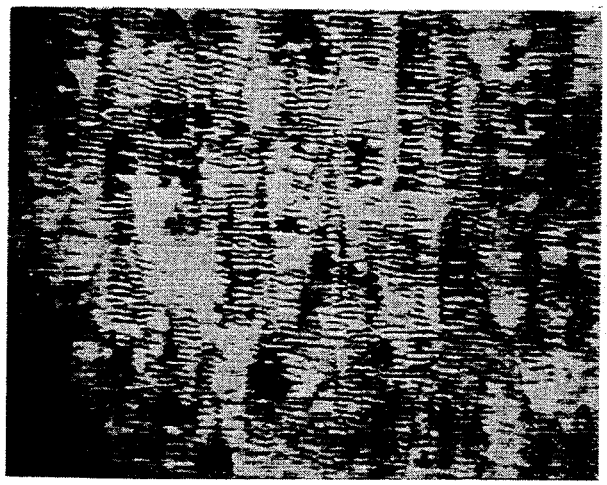
FIG.2A                    ×100
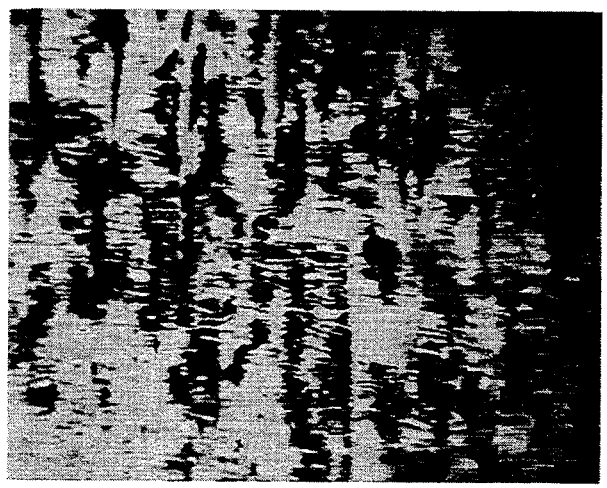
FIG.3A                    ×100
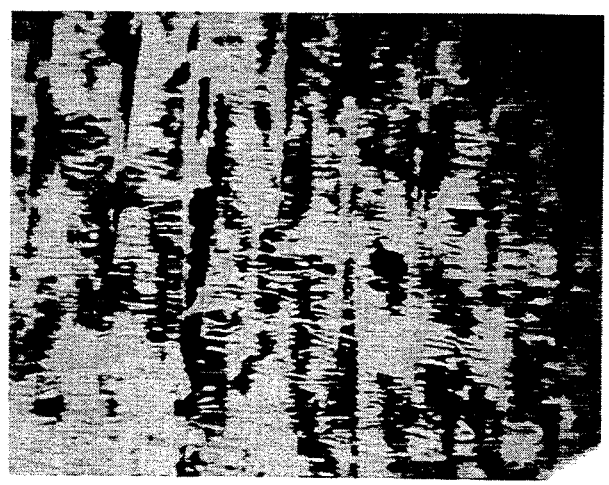
FIG.4A                    ×100

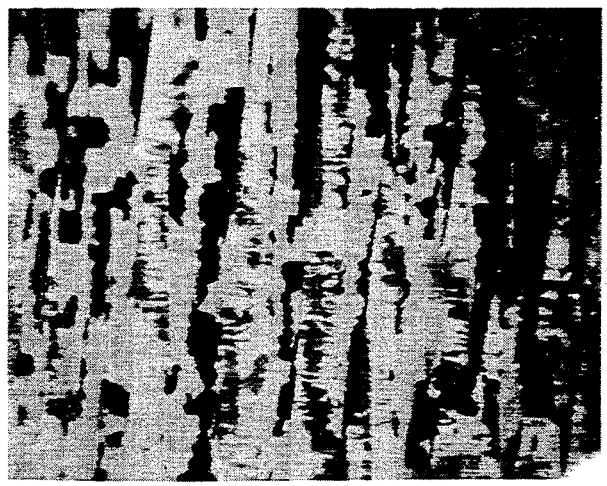
FIG.5A ×100
FIG.6A ×100
FIG.11A ×50

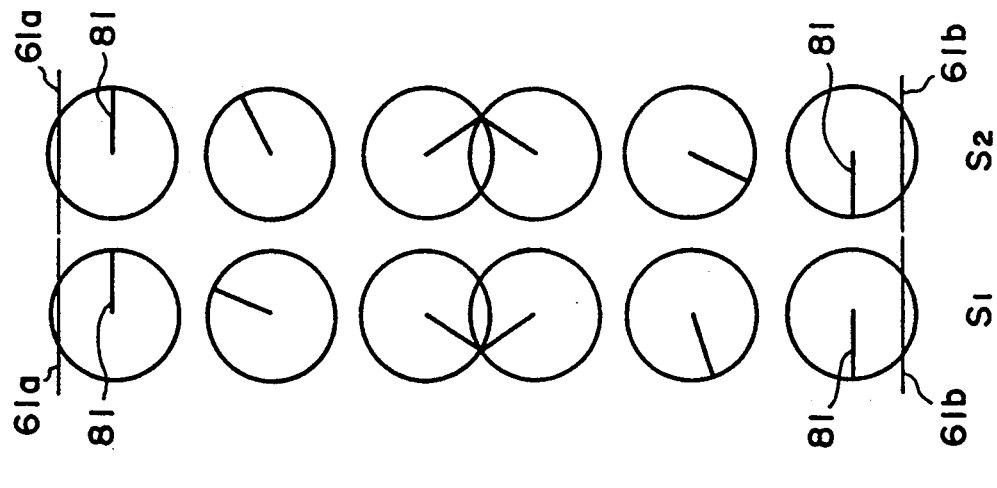
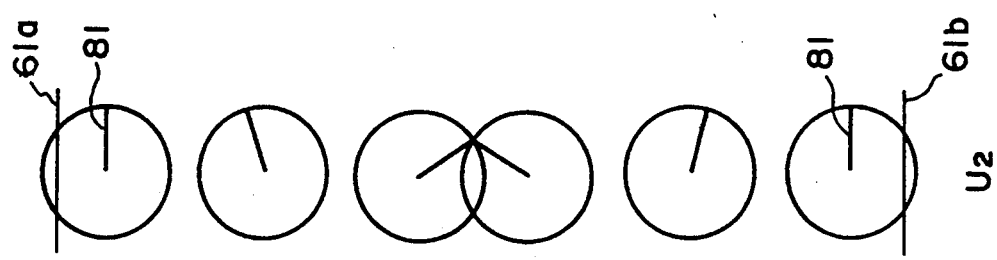
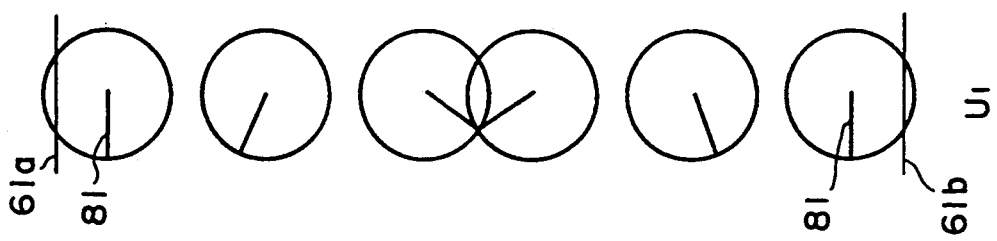
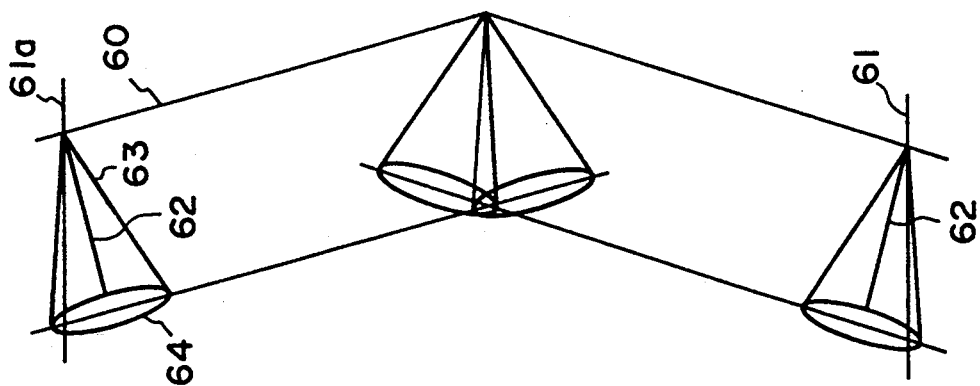
FIG. 8A   FIG. 8B   FIG. 8C

FIG. 12A  ×200
FIG. 13A  ×200
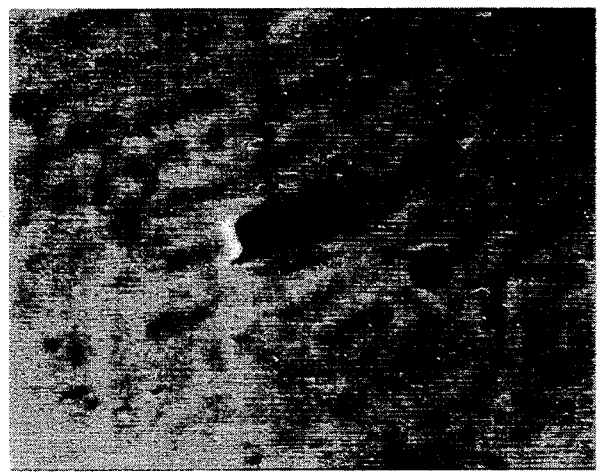
FIG. 14A  ×200

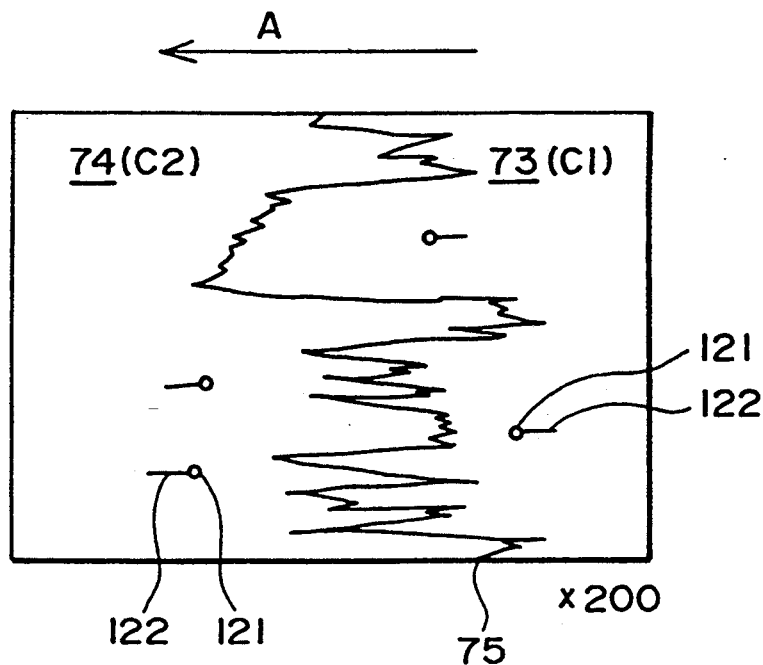
F I G. 13B
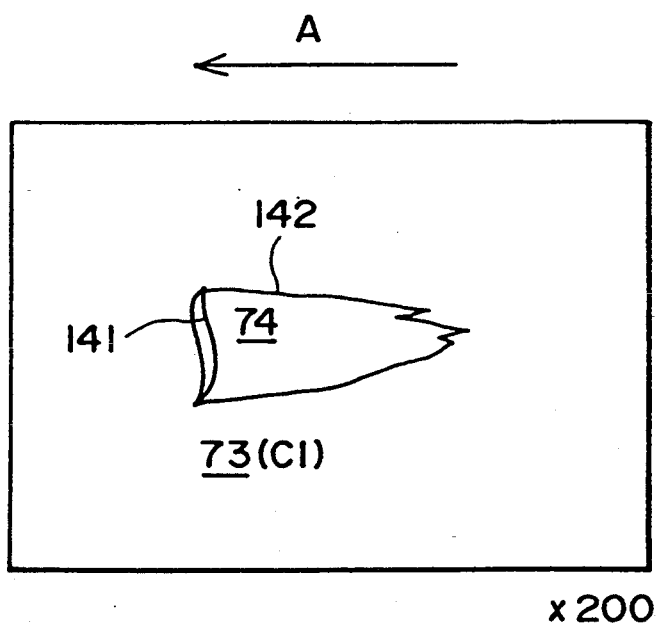
F I G. 14B

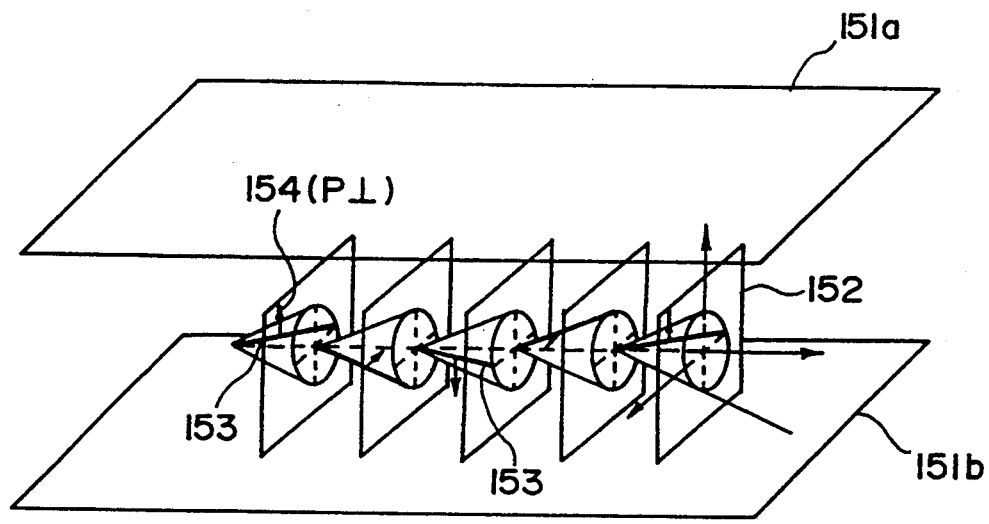
F I G. 15
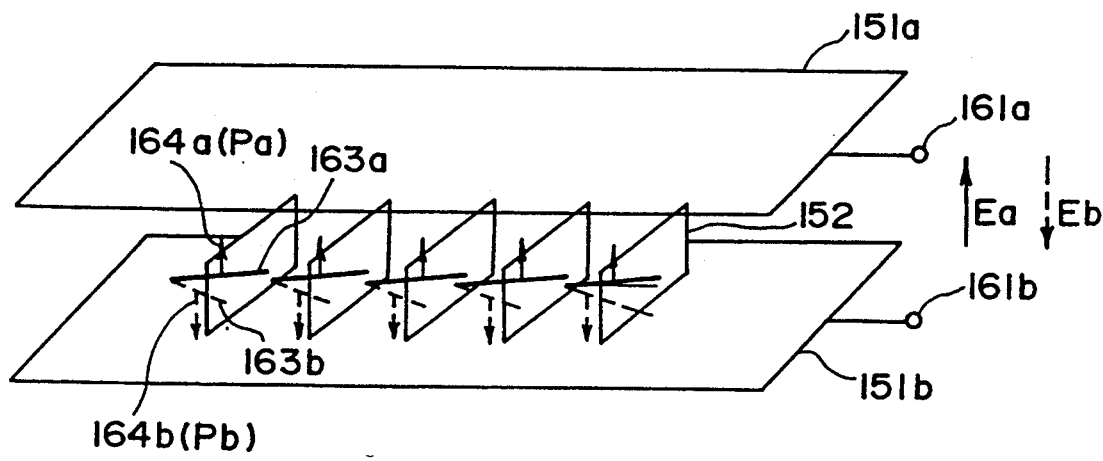
F I G. 16
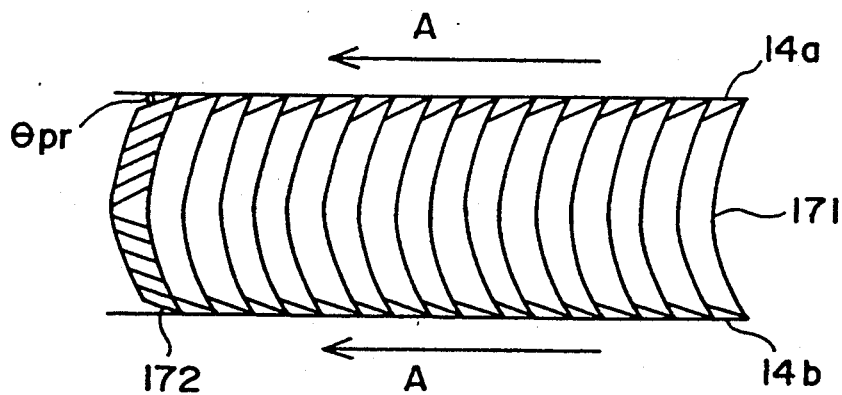
F I G. 17

FERROELECTRIC SMETIC LIQUID CRYSTAL DEVICE

CROSS-REFERENCE TO RELATED APPLICATIONS

This application is a continuation-in-part of application Ser. No. 07/998,817, filed Dec. 30, 1992, now abandoned, and application Ser. No. 07/899,161, filed Jun. 15, 1992, now U.S. Pat. No. 5,268,780. Application Ser. No. 07/998,817 is a division of application Ser. No. 07/495,607, filed Mar. 19, 1990, now U.S. Pat. No. 5,200,848, which in turn is a division of 07/245,644, filed Sep. 16, 1988, now issued as U.S. Pat. No. 4,932,758. Application Ser. No. 07/899,161, is a continuation of application Ser. No. 07/519,916, filed May 7, 1990, now abandoned.

FIELD OF THE INVENTION AND RELATED ART

The present invention relates to a liquid crystal device to be used in a liquid crystal display device or a liquid crystal-optical shutter, etc., particularly a liquid crystal device by use of a ferroelectric liquid crystal, more particularly to a liquid crystal device which has been remarkably improved in alignment uniformity to provide an increased contrast between the dark and bright states and also in durability of the device.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107217/1981, U.S. Pat. No. 4,367,924). The ferroelectric liquid crystal has generally chiral smectic C phase (SmC*) or H phase (SmH*), in which it assumes a helical structure in a bulk phase. When the ferroelectric liquid crystal in such SmC* or SmH* phase is sandwiched between a pair of substrates which are disposed close enough to suppress the formation of the helical structure, it is provided with a bistable orientation or alignment state where the liquid crystal molecules assume either one of a first optically stable state and a second optically stable state in response to an applied electric field, shows a memory characteristic of retaining the resultant state in the absence of an electric field, and also shows a high-speed response to a change in electric field, so that the ferroelectric liquid crystal is expected to be widely utilized in a high speed and memory type optical modulation device.

For accomplishing the above-mentioned memory characteristic and high speed responsiveness of an optical modulation device using such a ferroelectric smectic liquid crystal placed in a bistable alignment state, it is required that the bistable alignment state is stably and uniformly retained in the device, and the device is excellent in durability and shows a high contrast between the dark and bright states.

U.S. Pat. No. 4,639,089 to S. Okada et al discloses that a ferroelectric smectic liquid crystal having a temperature range of assuming cholesteric phase is applied to a liquid crystal device provided with a uniaxial orientation axis by rubbing or oblique vapor deposition, thereby to realize a ferroelectric smectic liquid crystal device with a uniform bistable alignment state.

Such a ferroelectric smectic liquid crystal device in a uniform bistable alignment state realized through rubbing or oblique vapor deposition is liable to provide a lower transmittance in the bright memory state than the one taught by N. A. Clark, et. al.

The above-mentioned ferroelectric smectic liquid crystal in the ferroelectric smectic liquid crystal device comprises liquid crystal molecules aligned in a high degree of order because of its uniform alignment state. Such an alignment state in a high degree of order is rather sensitive to a stress from outside the cell (device), such as impact or distortion, and causes a disorder in liquid crystal molecular alignment, typically occurrence of a sanded texture, when subjected to such a stress. The occurrence of a sanded texture by application of an impact is disclosed by U.S. Pat. No. 4,674,839 to A. Tsuboyama et al.

Further, in a liquid crystal device utilizing birefringence of a liquid crystal, the transmittance under right angle cross nicols is given by the following equation:

$$I/I_0 = \sin^2 4\theta \, \sin^2(\Delta nd/\lambda)\pi,$$

wherein
- $I_0$: incident light intensity,
- $I$: transmitted light intensity,
- $\theta$: tilt angle,
- $\Delta n$: refractive index anisotropy,
- $d$: thickness of the liquid crystal layer,
- $\lambda$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle in a non-helical structure for realizing bistability should desirably be as close as possible to 22.5 degrees.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, according to our experiments, it has been found that a tilt angle $\theta$ (an angle shown in FIG. 3 as described below) in a ferroelectric liquid crystal with a non-helical structure obtained by alignment with an alignment control film of the prior art has become smaller as compared with a tilt angle Ⓗ (the angle Ⓗ is a half of the apex angle of the cone shown in FIG. 2 as described below) in the ferroelectric liquid crystal having a helical structure. Particularly, the tilt angle $\theta$ in a ferroelectric liquid crystal with a non-helical structure obtained by alignment with alignment control films of the prior art was found to be generally on the order of 3-8 degrees, and the transmittance at that time was at most about 3 to 5%.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle $\theta$ in a non-helical structure is smaller than the tilt angle $(H)$ in a helical structure. More specifically, it has been found that the tilt angle $\theta$ in a non-helical structure becomes smaller than the tilt angle $(H)$ because of a twist alignment of liquid crystal molecules in the non-helical structure. Thus, in a ferroelectric liquid crystal having a non-helical structure, liquid crystal molecules are aligned with a twist from a molecular axis adjacent to an upper substrate to a molecular axis adjacent to a lower substrate continuously at a certain twist angle. This leads to a phenomenon that the tilt angle $\theta$ in the non-helical structure is smaller than the tilt angle $(H)$ in the helical structure.

Further, in an alignment state of a chiral smectic liquid crystal attained by a conventional polyimide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev due to the presence of the polyimide film as an insulating layer between the electrode and the liquid crystal layer, and the reverse electric field Vrev has caused an after-image during display. The generation of the above-mentioned reverse electric field has been reported in "Switching characteristic of SSFLC" by Akio Yoshida, "Preprint for Liquid Crystal Forum, October 1987" p.p. 142–143.

SUMMARY OF THE INVENTION

It is therefore an object of the present invention to provide a ferroelectric smectic liquid crystal device in a uniform bistable alignment state, which shows a high stability against an impact or distortion.

Another object of the present invention is to provide a ferroelectric smectic liquid crystal device in a uniform bistable alignment state, which provides a large contrast between the bright and dark states.

Another object of the present invention is to provide a liquid crystal device using a chiral smectic liquid crystal in an alignment state capable of realizing a high contrast.

According to a principal object aspect of the present invention, there is provided a liquid crystal device having an effective display region, comprising: a pair of substrates, an alignment film comprising a polyimide which has a fluorine-containing substituent in its carboxylic acid-originated moiety, disposed on at least one of said pair of substrates and subjected to an aligning treatment, and a chiral smectic liquid crystal disposed between the pair of substrates in an alignment state where its helical structure is suppressed; said chiral smectic liquid crystal forming an aligned region occupying an area which is at least 95% of the effective display region, said aligned region including a plurality of unidirectionally bent layers each organized by plural liquid crystal molecules in chiral smectic phase.

According to another aspect of the present invention, there is provided a liquid crystal device having an effective display region, comprising: a pair of substrates, a pair of alignment films comprising a polyimide which has a fluorine-containing substituent in its carboxylic acid-originated moiety, respectively disposed on said pair of substrates and subjected to an aligning treatment, and a chiral smectic liquid crystal disposed between the pair of substrates in an alignment state where its helical structure is suppressed; said chiral smectic liquid crystal forming an aligned region occupying an area which is at least 95% of the effective display region, said aligned region including a plurality of unidirectionally bent layers each organized by plural liquid crystal molecules in chiral smectic phase and including liquid crystal molecules which are inclined at mutually opposite inclination sense in the vicinity of the alignment film surfaces.

According to a further aspect of the present invention, there is provided a liquid crystal device having an effective display region, comprising: a pair of substrates, a pair of alignment films comprising a polyimide which has a fluorine-containing substituent in its carboxylic acid-originated moiety, respectively disposed on said pair of substrates and subjected to an aligning treatment, and a chiral smectic liquid crystal disposed between the pair of substrates in an alignment state where its helical structure is suppressed; said chiral smectic liquid crystal forming an aligned region occupying an area which is at least 95% of the effective display region, said aligned region including a plurality of layers each organized by plural liquid crystal molecules including liquid crystal molecules which are inclined at mutually opposite inclination sense in the vicinity of the alignment film surfaces, the layers being inclined at an angle of at least 95 degrees in the same rotational sense as the inclinations of the liquid crystal molecules in the vicinity of the alignment film surfaces so that the layers are unidirectionally bent corresponding to the inclinations the layers.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 2A–6A are microscopic photographs showing alignment states of a ferroelectric liquid crystal varying depending on temperatures; and FIGS. 2B–6B are sketches for illustration based on FIGS. 2A–6A.

FIG. 8A is a schematic sectional view showing an alignment state of a chiral smectic liquid crystal aligned according to the present invention; FIG. 8B is an illustration of C-director alignments in a uniform alignment state; and FIG. 8C is an illustration of C-director alignments in a splay alignment state.

FIGS. 11A–14A are microscopic photographs showing C1 and C2 alignment domains; FIGS. 11B–14B are sketches for illustration based on FIGS. 11A–14A.

FIG. 15 is a schematic perspective view for illustrating an operation of a ferroelectric liquid crystal device, and FIG. 16 is a schematic perspective view for illustrating an operation of a surface-stabilized ferroelectric liquid crystal device in a bistable alignment state.

FIG. 17 is a schematic sectional view across the thickness of a cell illustrating a bend alignment state in smectic A phase.

DESCRIPTION OF THE PREFERRED EMBODIMENTS

Figure 1A:
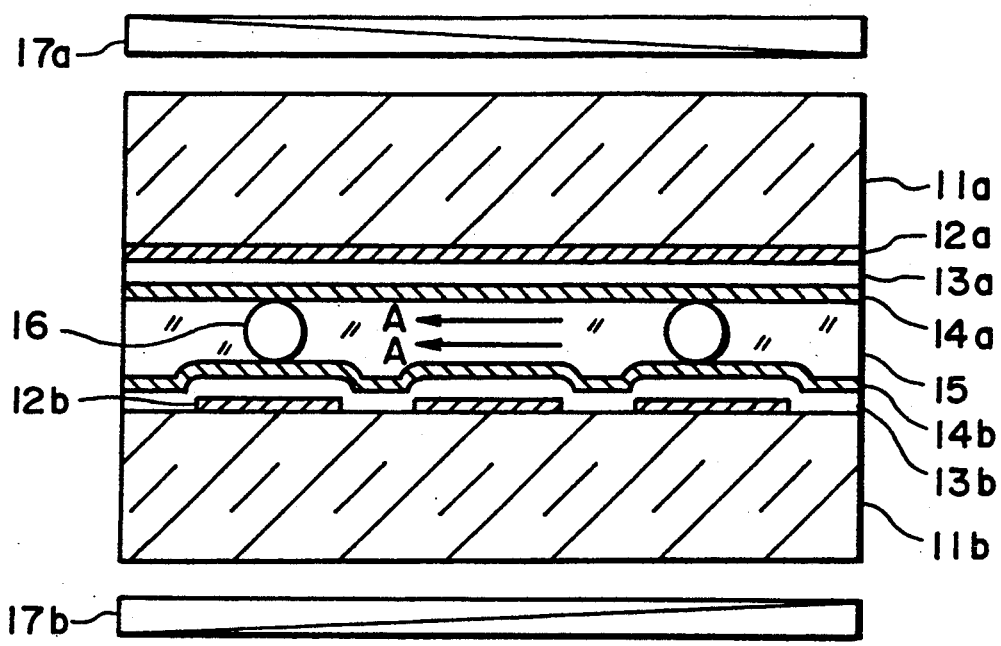
FIG. 1A is a schematic sectional view of an embodiment of the liquid crystal device according to the present invention and FIG. 1B is a schematic plan view illustrating rubbing axes provided to a pair of substrates.

FIG. 1A is a schematic partial sectional view of a ferroelectric smectic liquid crystal device according to the present invention.

The liquid crystal device comprises substrates (glass plates) 11a and 11b coated with transparent electrodes 12a and 12b, respectively, of $In_2O_3$, ITO (indium tin oxide), etc., which are further coated with insulating films 13a and 13b, respectively, of e.g., 200 Å to 1000 Å-thick films of $SiO_2$, $TiO_2$, $Ta_2O_5$, etc., and then with alignment control films 14a and 14b, respectively, of e.g., 50 Å to 1000 Å-thick films of polyimide, polyamide, polyester, etc. The alignment control films 14a and 14b have been subjected to rubbing in the directions of arrows A which are parallel with each other and identical in direction. A ferroelectric smectic liquid crystal 15 is disposed between the substrates 11a and 11b which are spaced from each other with a spacing (e.g., 0.1–3 μm) sufficiently small to suppress the formation of the helical structure of the ferroelectric smectic liquid crystal 15, so that the ferroelectric smectic liquid crystal 15 is placed in a bistable alignment state providing two stable orientation states. The sufficiently small spacing may be held by spacer beads 16 (silica beads, alumina beads, etc.).

The thus formed cell structure is sandwiched between a pair of polarizers 17a and 17b arranged in cross nicols for optically discriminating the two stable orientation states of the liquid crystal molecules.

According to our experiments as will be explained hereinafter based on examples, it has been found possible, by selecting a liquid crystal material, alignment control film and the direction of uniaxial alignment axes provided to the pair of substrates, to provide different bistable alignment states on a higher temperature side and a lower temperature side in the temperature range of chiral smectic C phase, of which the bistable alignment state on the lower temperature side is highly resistant to impact or distortion and provides a large contrast between the black and dark states. In the lower-temperature bistable alignment state, the ferroelectric smectic liquid crystal has an inclination of forming a connected pair of a lightning defect and a hair pin defect in which the lightning defect comes after the hair pin defect in the rubbing direction commonly provided to the pair of substrates. In contrast thereto, in the higher-temperature bistable alignment state, the ferroelectric smectic liquid crystal has an inclination of forming a connected pair of a lightning defect and a hair pin defect in which the hair pin defect comes after the lightning defect in the rubbing direction. For convenience, in the chiral smectic C phase temperature range, the above-mentioned higher-temperature alignment state is referred to as C1 alignment or C1 sub-phase and the lower-temperature alignment state is referred to as C2 alignment state or C2 sub-phase.

FIGS. 2A–6A are microscopic photographs (magnification of 100) of alignment states of a 1 cm × 1 cm test ferroelectric smectic liquid crystal cell at various temperatures observed through right angle cross nicols respectively arranged to provide the darkest condition of the dark state (i.e., extinction position). FIGS. 2B–6B are sketches based on FIGS. 2A–6A, respectively.

Figure 6B:
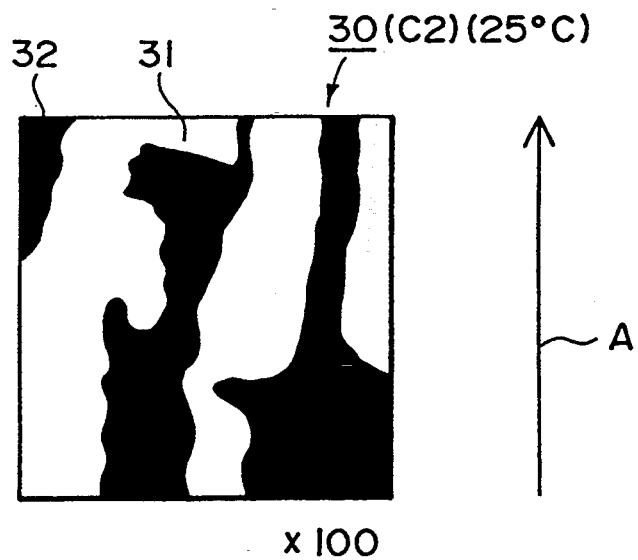

Referring to FIGS. 2B–6B, FIG. 2B shows a C1 alignment state, FIG. 6B shows a C2 alignment state, and FIGS. 3B–5B shows states where a C1 alignment state and a C2 alignment state are in mixture (hereinafter called "C1/C2 mixture alignment"). According to our observation, a C1 domain shown in FIGS. 2–5 occupied a substantial area even macroscopically (i.e., according to naked eye observation).

For preparing the cell, the liquid crystal used was a ferroelectric smectic liquid crystal "CS-1014" (trade name, available from Chisso K.K.). The alignment film was formed by using an allcyclic polyimide film-forming liquid "SUN-EVER 150" (trade name, available from Nissan Kagaku Kogyo K.K.). The pair of substrates were provided with rubbing axes which were in parallel with each other and identical in direction. (The details of the production of the cell are the same as those given in Example 1 appearing hereinafter except for the cell size and the absence of spacer beads.) The liquid crystal in the cell showed the following phase transition characteristic (the numbers indicated on the arrows denote phase transition temperatures in °C.):

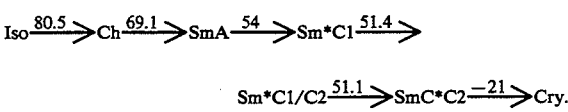

Iso: isotropic phase,
Ch: cholesteric phase,
SmA: smectic A phase,
Sm*C1: chiral smectic C phase showing C1 sub-phase
Sm*C1/C2: chiral smectic C phase showing a mixture of C1 and C2 sub-phases
Sm*C2: chiral smectic C phase showing C2 sub-phase
Cry: crystal phase.

The Iso-Ch phase phase transition temperature, Ch-SmA phase transition temperature, SmA-, Sm*C1 phase transition temperature and Sm*C2-Cry. phase transition temperature were measured by a temperature controller "FP800" (trade name, available from Mettler Instrument AG, Switzerland). The Sm*C1-Sm*C1/C2 phase transition temperature and Sm*C1/C2-Sm*C2 phase transition temperature were determined through microscopic observation on temperature decrease.

Figure 2B:
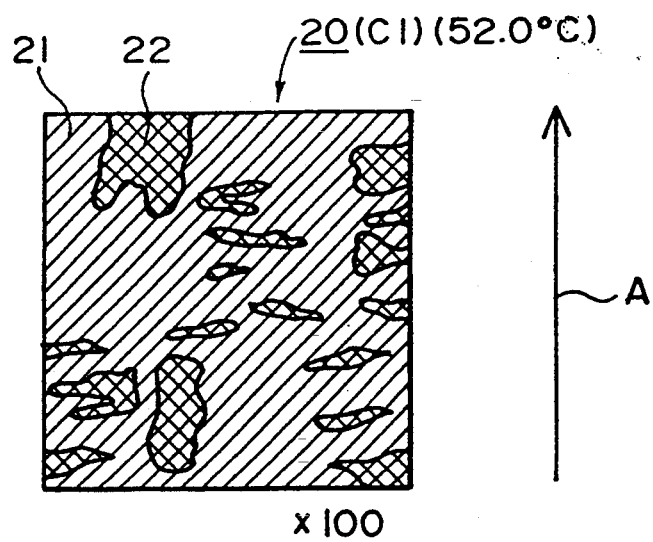
Figure 3B:
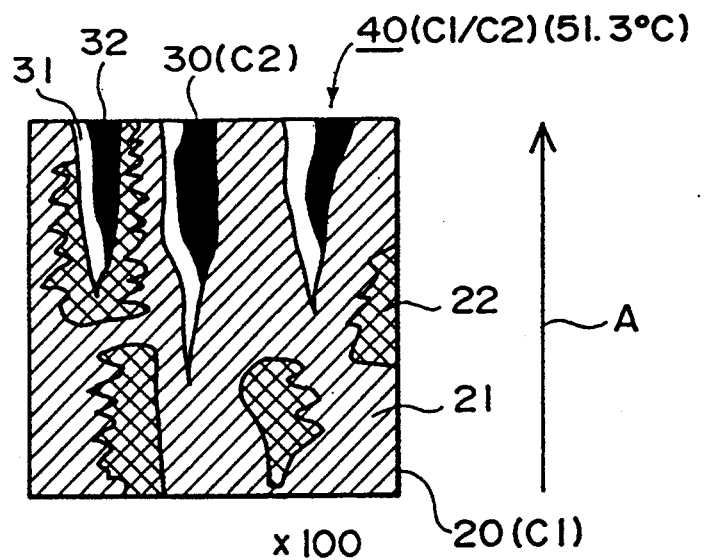
Figure 4B:
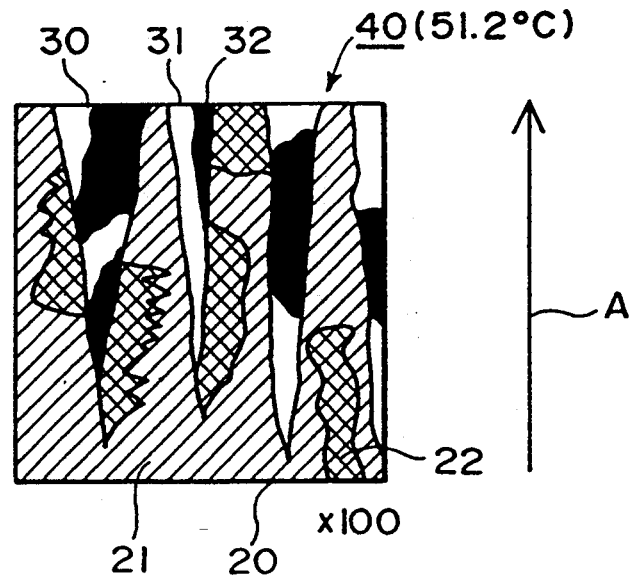
Figure 5B:
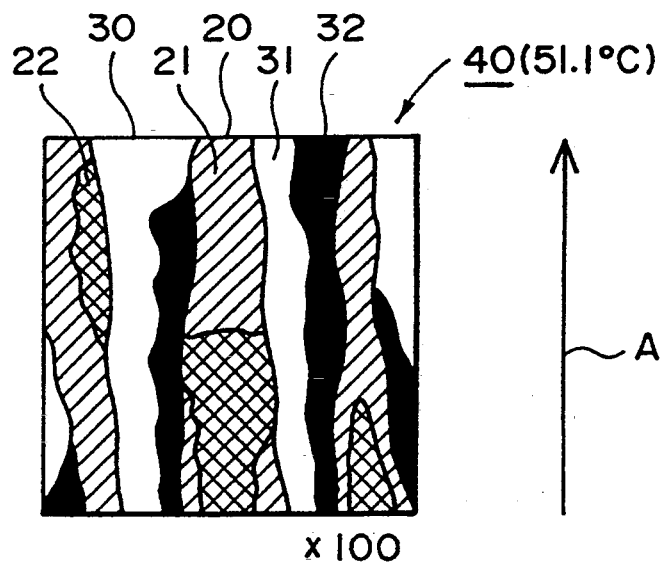

FIG. 2 (FIG. 2A or 2B) shows the extinction state (the state given by the extinction position of right angle cross nicols providing the darkest condition of the dark state) of a C1 alignment domain 20 at 52.0° C., which is bluish including a blue bright state 21 and a blue dark state 22. FIG. 6 (FIG. 6A or 6B) shows a blackish extinction state of a C2 alignment domain 30 at 25° C. including a white bright state 31 and a black dark state 32. FIGS. 3 to 5 respectively show a mixture domain 40 including a bluish extinction state of a C1 alignment domain 20 and a blackish extinction state of a C2 alignment domain 30 at 51.3° C., 51.2° C. and 51.1° C., respectively. Further, the C1 alignment domain the C2 alignment domain and the C1/C2 mixture domain were respectively supplied with a pulse of 50 μsec and +30 V while retaining their states and observed with respect to their extinction states. As a result, the C1 alignment domain 20 provided a blue extinction state and the C2 alignment domain provided a black extinction state. Further, the C1 alignment domain 20, the C2 alignment domain 30 and the C1/C2 mixture domain 40 were then supplied with an inversion pulse of 50 μsec and −30 V and then observed with respect to their extinction states. As a result, the C1 alignment domain 20 provided a blue extinction state and the C2 alignment domain 30 provided a black extinction state, again.

As described above, the cell provided a C1 alignment domain or sub-phase 20 and a C2 alignment domain or sub-phase 30, which are different from each other, in the temperature range of chiral smectic C phase. As the temperature was lowered, the C2 alignment domain 30 was gradually grown to occupy a major areal proportion (60% or more, preferably 90% or more) and the C1 alignment domain 20 shrinked correspondingly to occupy a minor areal proportion (40% or less, preferably 10% or less) until it reached a macroscopically or substantially negligible except for a minor portion in the vicinity of the cell periphery as is shown in FIGS. 3 to 5. Further, FIGS. 3 to 6 show that the C2 alignment domain 30 was grown from the C1 alignment domain 20 shown in FIG. 2 and through the C1/C2 mixture alignment domains 40 shown in FIGS. 3–5). Further, as will be clarified in Examples appearing hereinafter, it has been found that a ferroelectric smectic liquid crystal device placed in a bistable alignment state in such a lower-temperature C2 sub-phase or alignment state substantially occupied by the C2 alignment domain 30, is remarkably more resistant to an external impact or distortion and provides a larger contrast between the dark and bright states than a device placed in a higher-temperature C1 sub-phase and a device placed in a conventional bistable alignment state formed by providing a pair of substrates with rubbing axes which are parallel with each other but are reverse in direction.

Figure 7A:
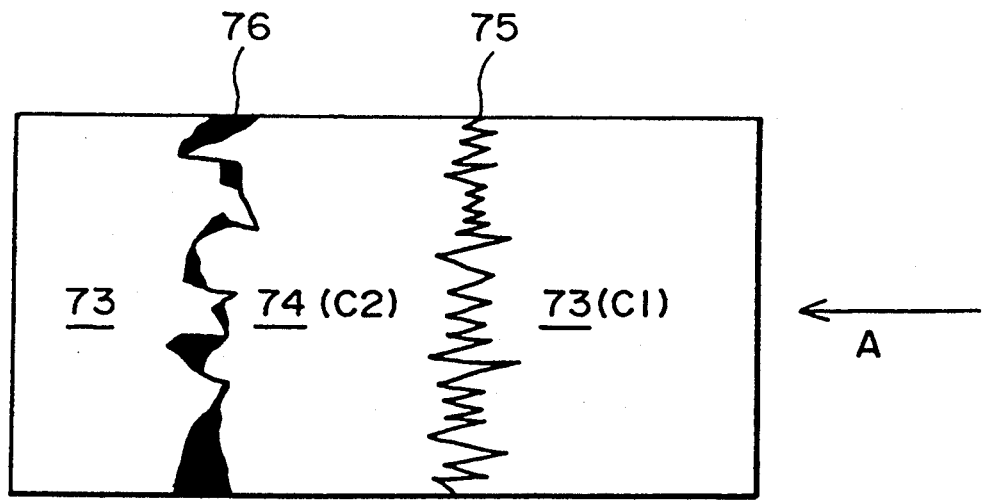
FIG. 7A is a schematic plan view showing a C1 alignment domain and a C2 alignment domain.
Figure 7B:
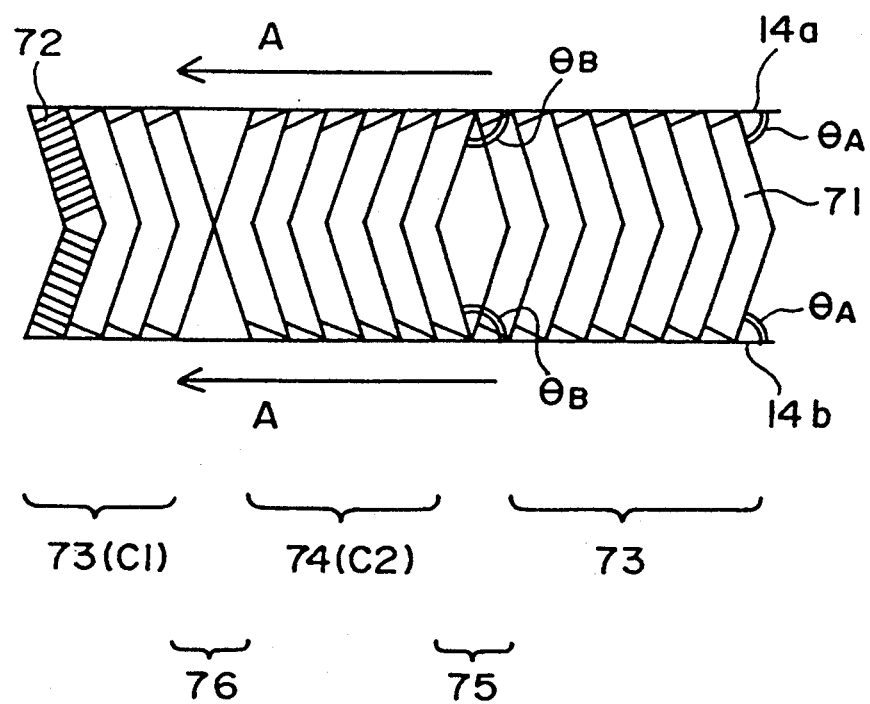
FIG. 7B is a corresponding sectional view across the thickness.
Figure 7C:
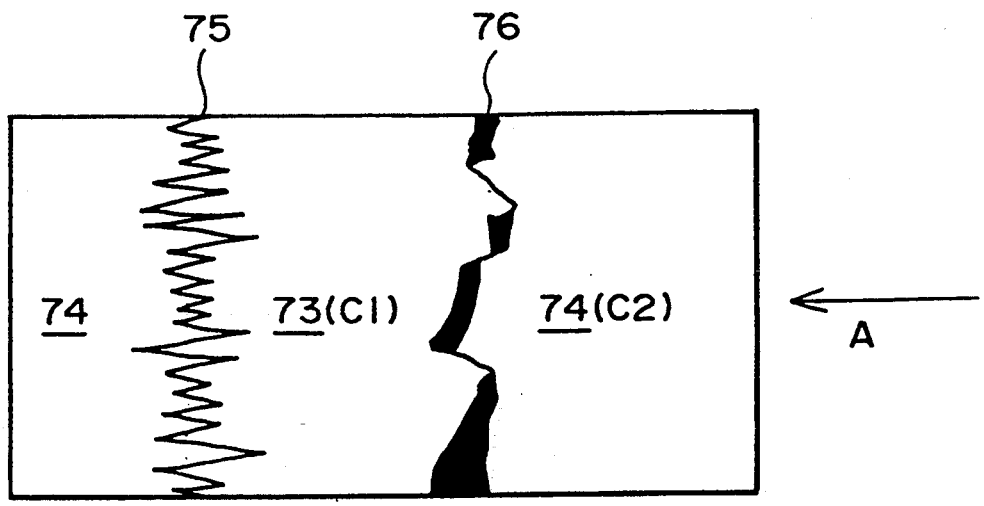
FIG. 7C is another schematic plan view showing a C1 alignment domain and a C2 alignment domain.
Figure 7D:
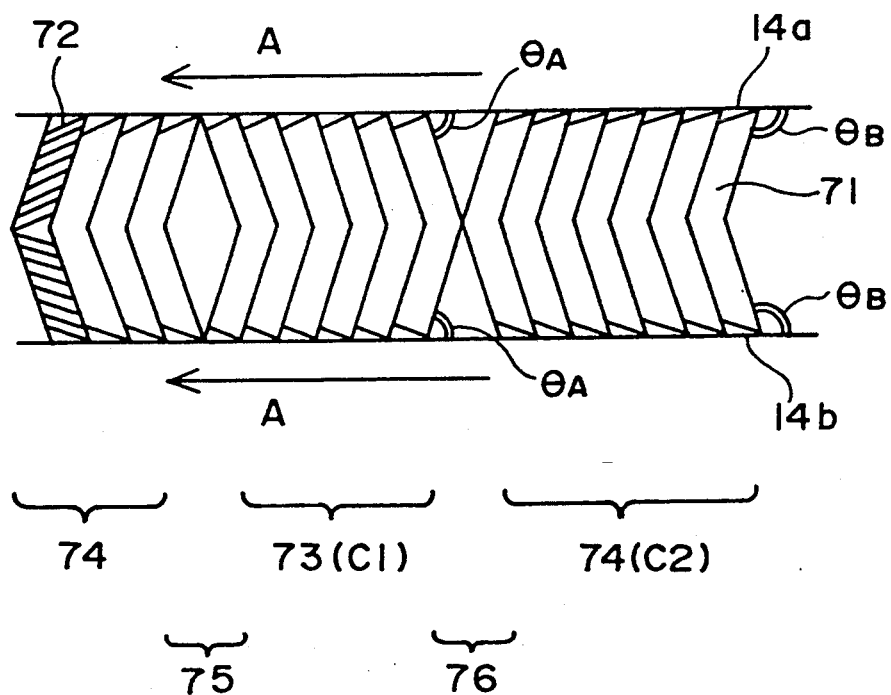
FIG. 7D is a corresponding sectional view across the thickness.

The characteristics of the C1 and C2 sub-phases or domains will now be explained with reference to drawings. FIGS. 7A and 7B are a partial schematic plan view and a corresponding sectional view, respectively, showing a hair pin defect and a lightning defect formed in a generally C1 alignment domain. FIGS. 7C and 7D are a partial schematic plan view and a corresponding sectional view, respectively, showing a hair pin defect and a lightning defect formed in a generally C2 alignment domain.

Referring to Fibres 7B and 7D, in a gap between a pair of alignment control films 14a and 14b each provided with a common rubbing direction A, there are formed a plurality of liquid crystal molecular layers 71 each composed of a plurality liquid crystal molecules in chiral smectic C phase. The liquid crystal molecular layers 71 constitute domains of different alignment states including a C1 alignment domain 73 and a C2 alignment domain.

As shown in FIGS. 7B and 7D, a molecular layer 71 constituting a C1 alignment domain 73 is inclined to form an acute angle $\theta_A$ with respect to the upper and lower alignment control films 14a and 14b in the neighborhood of the films. On the other hand, a molecular layer 71 constituting a C2 alignment domain 74 is inclined to form an obtuse angle.

A large size of lightning defect 75 and a large size of hair pin defect 76 are each formed at a boundary between a C1 alignment domain 73 and a C2 alignment domain 74.

Further, when a cell containing a C1 alignment domain 20 as shown in FIG. 2 is subjected to a distortion, a C2 alignment domain is found at the distorted portion, thus forming boundary between a C2 alignment domain and a C1 alignment domain so that a hair pin defect and a lightning defect occur.

FIG. 8A is a schematic sectional view showing an alignment state of liquid crystal molecules attained by the present invention, and FIG. 8B is a view showing alignment of corresponding C-directors.

Reference numerals 61a and 61b in FIG. 8A denote upper and lower substrates, respectively. Numeral 60 denotes a molecular layer composed of liquid crystal molecules 62, and liquid crystal molecules 62 are aligned so as to change their positions along the bottom face 64 (circular) of a cone 64. FIG. 8B more specifically shows a change in C-directors. Referring to FIG. 8B, at $U_1$ are shown C-directors 81 (each being a projection of a molecular long axis onto an imaginary plane perpendicular to the normal to a molecular layer 60) in one stable orientation state, and at $U_2$ are shown C-directors 81 in the other stable orientation state.

On the other hand, an alignment state attained by a conventional rubbing-treated polyimide film may be represented by a C-director diagram of FIG. 8C, which shows an alignment state wherein molecular axes are twisted in a large degree from the upper substrate 61a to the lower substrate 61b to provide a smaller tilt angle $\theta$.

Figure 9A:
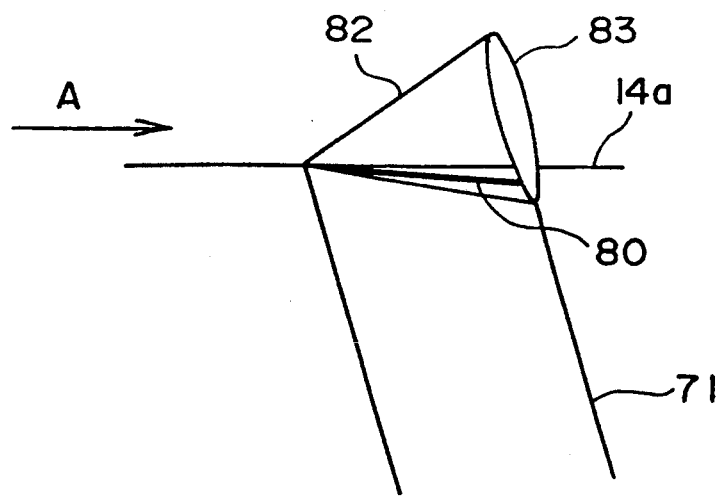
FIG. 9A is a schematic view illustrating a C2 alignment.
Figure 9B:
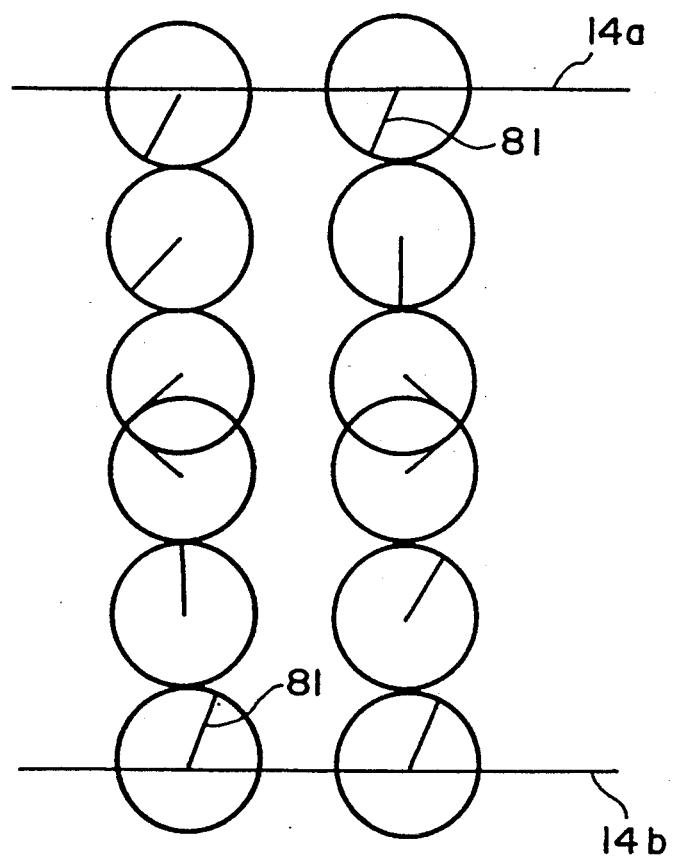
FIG. 9B is a view showing a projections of C-directors corresponding thereto.

FIG. 9A is an enlarged view illustrating a molecular layer 71 and a liquid crystal molecule 80 in a C2 alignment state. FIG. 9B shows a typical pair of twisting arrangements of C director 81 oriented in a C2 alignment state. Molecular long axes 80 in a molecular layer 71 are arranged while changing their positions on the bases 83 (circles) of cones 82 between the interface with the upper alignment control film 14a and the interface with the lower alignment control film 14b. The right half arrangement and the left half arrangement of FIG. 9B correspond to orientation states after application of a positive (or negative) polarity pulse and a negative (or positive) polarity pulse.

Figure 10A:
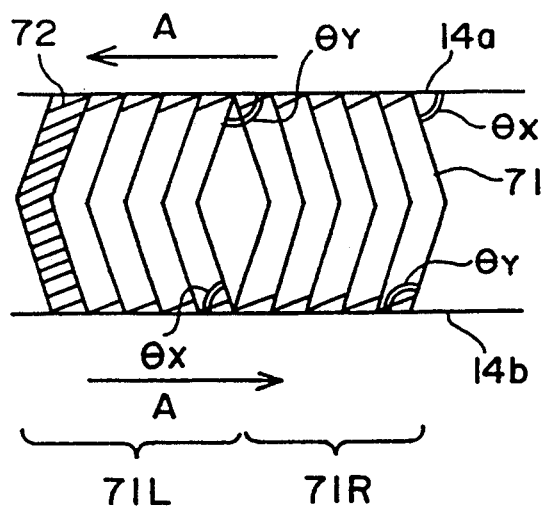
FIG. 10A is a schematic view illustrating an alignment state in a conventional device.
Figures 10B, 10C:
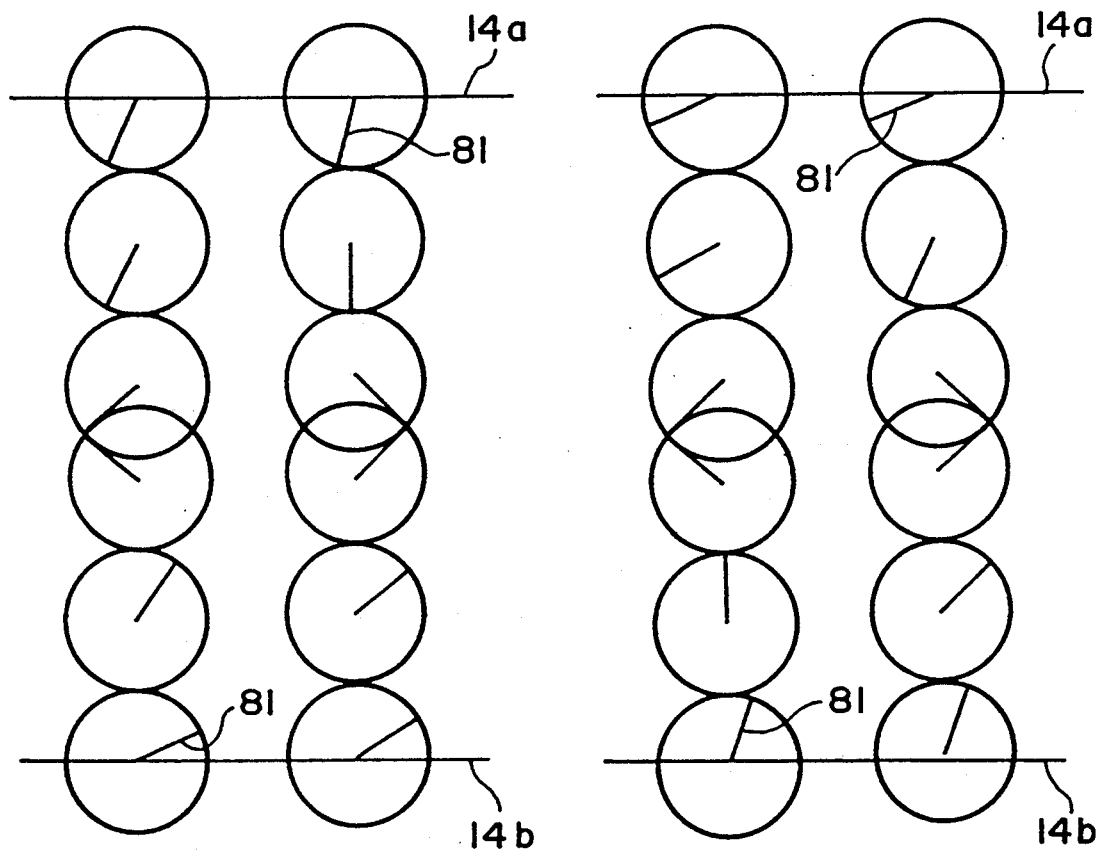
FIGS. 10B and 10C are views showing projections of C-directors corresponding thereto.

FIGS. 10A–10C illustrate an alignment state formed between a pair of alignment states 14a and 14b provided with rubbing axes A which are parallel with each other but are reverse in direction. More specifically, FIG. 10A shows a plurality of liquid crystal molecular layers 71 each composed of a plurality of liquid crystal molecules in chiral smectic C phase. The liquid crystal molecular layers 71 constitute domains of different alignment states. In the alignment state shown in FIG. 10A, with respect to the rubbing direction A provided to the upper alignment control film 14a, molecular layers 71R shown on the right side are inclined to form an acute angle $\theta x$ and molecular layer 71L shown on the left side are inclined to form an obtuse angle $\theta y$, respectively in the neighborhood of the alignment control film 14a. On the other hand, with respect to the rubbing direction A provided to the lower alignment control film 14b, the right-side molecular layers 71R are inclined to form an obtuse angle $\theta y$ and the left-side molecular layers 71L are inclined to form an acute angle $\theta x$, respectively in the neighborhood of the lower alignment control film 14b. In other words, each of the molecular layers 71R and 71L form an inclination at an acute angle $\theta x$ and an obtuse angle $\theta y$ in the neighborhood of the upper and lower alignment films. Twisting arrangements of C-directors in these alignments states are shown in FIGS. 10B and 10C. FIG. 10B shows twisting of C-directors 81 in a molecular layer 71L in which the right and left arrangements correspond to orientation states formed after application of a positive (or negative) polarity pulse and a negative (or positive) polarity pulse, respectively. Further, FIG. 10C shows twisting of C-directors 81 in a molecular layer 71R, in which the right and left arrangements correspond to orientation states formed after application of a positive (or negative) polarity pulse and a negative (or positive) polarity pulse, respectively.

In contrast thereto, in FIG. 7, a molecular layer 71 forms an acute inclination angle $\theta_A$ on both the upper and lower alignment control films in the C1 alignment domain 73, and an obtuse angle $\theta_B$ on both the upper and lower alignment control films in the C2 alignment domain 74.

Further, the C-director arrangement corresponding to the C1 alignment state (shown in FIG. 8B) and the C-director arrangement corresponding to the C2 alignment state (shown in FIG. 9B) are not symmetrical with each other. In contrast thereto, the C-director arrangements shown in FIGS. 10B and 10C corresponding to the molecular layers 71R and 71L, respectively, shown in FIG. 10A are mutually optical equivalent and are symmetrical with each other.

Figure 11B:
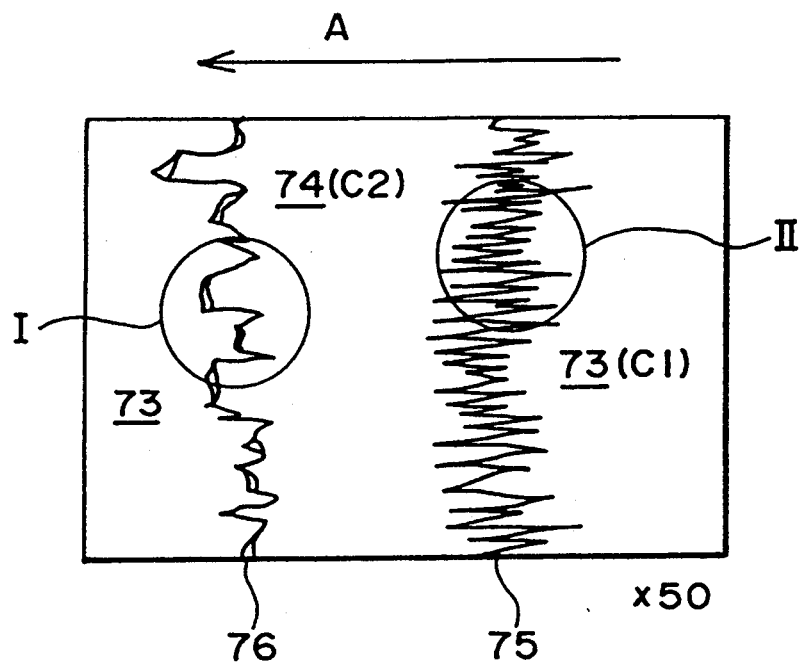
Figure 12B:
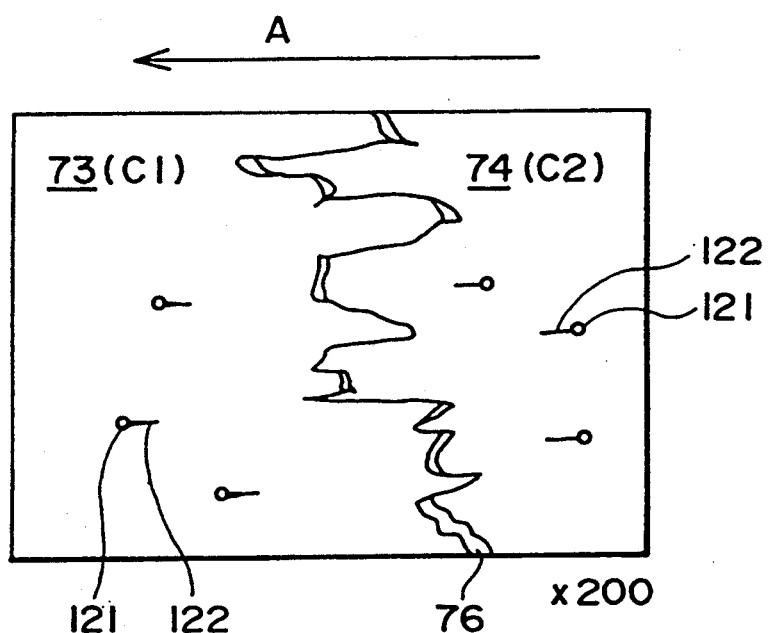

FIG. 11A is a microscopic photograph (×50) of an alignment state wholly switched to the dark state corresponding to FIG. 7A) in a ferroelectric smectic liquid crystal cell (described in Example 1 appearing hereinafter) observed through right angle cross nicols arranged in the extinction position (at 51.3° C.), and FIG. 11B is a sketch based on FIG. 11A. FIGS. 12A and 13A are microscopic photographs (×200) providing enlarged views of regions I and II; respectively, indicated in FIG. 11B, observed through right angle cross nicols arranged at a position slightly deviated from the extinction position so as to provide a generally blackish view, and FIGS. 12B and 13B are sketches based thereon. FIG. 14A is a microscopic photograph (×200) of a C1 alignment domain formed in the same cell as FIG. 11A wherein a C2 alignment domain was generated by distortion, observed through right angle cross nicols at a position slightly deviated from the extinction position. FIG. 14B is a sketch based on FIG. 14A.

In the alignment state shown in FIG. 11 (11A or 11B), a C1 alignment domain 73 and a C2 alignment domain 74 are co-present, and at boundaries therebetween, a lightning defect 75 and a hair pin defect 76 occur. As shown in FIG. 11B, when a C2 alignment domain 74 is formed surrounded by a C1 alignment domain 73, a lightning defect 75 occurs at a boundary changing from the c1 alignment domain 73 to the C2 alignment domain 74 in the rubbing direction A, and a hair pin defect 76 occurs at a boundary changing from the C2 alignment domain 74 to the C1 alignment domain 73 in the rubbing direction A.

According to the present invention, as shown in FIGS. 2 to 6, a C2 alignment domain 74 can be developed so as to occupy an almost entire region in the course of temperature decrease by appropriate selection of a liquid crystal material, alignment control films and rubbing directions applied thereto. In a preferred embodiment of the present invention, a C1 alignment domain 73 may be formed at only cell peripheral portions (e.g., in the neighborhood of a sealing member for sealing the cell) and a C2 alignment domain may be developed in a major central portion surrounded by the peripheral portions.

FIG. 12 (12A and 12B) shows connected pairs of a small hair pin defect 121 and a small lightning defect 122 generated due to the presence of spacer beads (of alumina or silica in an average diameter of about 1.5 μm) respectively in a C1 alignment domain 73 and a C2 alignment domain 74 formed with a hair pin defect 76 at the boundary therebetween. As shown in FIG. 12, in the C2 alignment domain 74, a connected pair of a hair pin defect 121 and a lightning defect 122 is so generated that the hair pin defect 121 comes after the lightning defect 122 in the rubbing direction A. To the contrary, in the C1 alignment domain 73, a lightning defect 122 comes after a hair pin defect in a connected pair in the rubbing direction A.

FIG. 13 (FIG. 13A or 13B) shows connected pairs of a hair pin defect 121 and a lightning defect 122 generated in a C1 alignment domain 73 and a C2 alignment domain 74 formed with a lightning defect 75 at the boundary therebetween. According to FIG. 13, it will be found that the connected pairs are generated in the same generation or arrangement orders in the C1 and C2 alignment domains 73 and 74 respectively as those explained with reference to FIG. 12.

FIG. 14 (FIG. 14A or FIG. 14B) shows a C2 alignment domain 74 generated by distortion in a C1 alignment domain 73. In this instance, a pair of hair pin defect 141 and a lightning defect 142 is formed around the C2 alignment domain in such a manner that the lightning defect 142 comes after the hair pin defect 141.

According to our observation, a hair pin defect is generated in a width of generally several microns, while a lightning defect is generated in a zigzag manner with a line width of generally below 1 micron.

Further, according to our experiments, when a C1 alignment domain 73 is supplied with a distortion, a C2 alignment domain 74 is formed in the C1 alignment domain 73 as shown in FIG. 14, and the thus formed C2 alignment domain stably remains for a long period of time. In contrast thereto, when a C2 alignment domain is supplied with a distortion, a C1 alignment domain 73 is generated in the C2 alignment domain 74, but the C1 alignment domain 73 disappears instantaneously. From this fact, it is understood that a C2 alignment domain is stabler than a C1 alignment state and has a property of being instantaneously restored to the original alignment state even if it is subjected to an external stress. In contrast thereto, a C1 alignment domain 73 is fragile to an external stress. Further, as will be understood from FIG. 11A, a C2 alignment domain 74 provides a transmittance which is remarkably smaller than that of a C1 alignment domain 73 respectively at the extinction position.

According to the present invention, it is possible to form a C2 alignment domain wherein a connected pair of a lightning defect and a hair pin defect is placed after a lightning defect in a connected pair in the uniaxial alignment axis direction so that the C2 alignment domain occupies a major portion (60% or more, preferably 90% or more) of the entire region of the cell until the C1 alignment domain becomes substantially or macroscopically negligible except for the peripheral portion of the cell. A ferroelectric smectic liquid crystal to be used in the present invention is not particularly limited per se but is restricted by a correlation with an alignment control film, so that a preferable combination of a ferroelectric smectic liquid crystal and an alignment control film should be selected. In a preferred embodiment of the present invention, it is possible to use a chiral smectic liquid crystal having temperature ranges for assuming cholesteric phase and smectic A phase in the course of temperature decrease.

In an embodiment of the present invention, a temperature range for providing a C1 alignment state wherein a lightning defect is formed after a hair pin defect, may be restricted to 1/5 or below, preferably 1/10 or below, further preferably 1/20 or below, of a temperature range for providing a C2 alignment state wherein a hair pin defect is formed after a lightning defect, respectively in the direction of a uniaxial alignment axis. Further, the lower temperature limit in the course of temperature decrease for allowing the presence of the C1 alignment state or domain in a substantial proportion (40% or above, preferably 10% or above) should be 30° C. or higher, preferably 40° C. or higher.

According to our experiments, it has been further found that, when a ferroelectric smectic liquid crystal cell in a bistable alignment state is formed by gradual cooling through smectic A phase in a cell subjected to a uniaxial aligning treatment such as rubbing, such a ferroelectric smectic liquid crystal cell obtained through smectic A phase giving a pre-tilt angle of 2 degrees or larger, preferably 3 degrees or larger, provides an improved contrast. It has been also found that an improved contrast is obtained when liquid crystal molecules are aligned in a bend alignment state in smectic A phase.

FIG. 17 is a schematic sectional view across the thickness of a cell illustrating the above-mentioned bend alignment state in smectic A phase. The cell comprises a plurality of molecular layers 171 each composed of a plurality of liquid crystal molecules 172 in smectic A phase. Each molecular layer in smectic A phase is in a warped or bent state, wherein a liquid crystal molecule is aligned to provide a pretilt angle $\theta pr$ of 2 degrees or larger, preferably 3 degrees or larger. The pretilt angle $\theta pr$ may be measured by a method described in G. Baur, V. Wittwer & D. W. Berreman, "Physical Letter", No. 56A, p. 142 (1976).

In the above explanation, explanation has been generally made based on embodiments wherein rubbing is used as a uniaxial aligning treatment. In the present invention, however, it is possible to use uniaxial alignment axis given by oblique vapor deposition. In this case, the axial direction of the oblique vapor deposition is determined by correlation with that of the rubbing axis giving the same direction of a pre-tilt angle $\theta pr$ in smectic A phase as shown in FIG. 17. More specifically, the uniaxial alignment axis direction may be referred to as the direction of the projection on a substrate concerned of the rising inclination direction of a liquid crystal molecule long-axis forming a pretilt angle with respect to the substrate.

Now, explanation of the operation principle of a ferroelectric smectic liquid crystal cell is supplemented to some extent. FIG. 15 illustrates schematically an example of a ferroelectric liquid crystal cell for explanation. Substrates (glass plates) 151a and 151b are coated with transparent electrodes of $In_2O_3$, $SnO_2$ or ITO (Indium Tin Oxide), etc., and a liquid crystal of SmC* (chiral smectic C phase) or SmH* (chiral smectic H phase) is hermetically disposed therebetween so that a plurality of liquid crystal molecular layers 152 are aligned perpendicular to the glass substrates. Full lines 153 represent liquid crystal molecules each having a dipole moment (P⊥) 154. When a voltage above a certain threshold value is applied between the electrodes on the substrates 151a and 151b, the helical structure of the liquid crystal molecules 153 is unwound or released to orient the liquid crystal molecules 153 so that all the dipole moments (P⊥) 154 may be directed in the electrical field direction. The liquid crystal molecules 153 have an elongated shape and show refractive anisotropy between the long axis and the short axis thereof. Accordingly, it is easily understood that when, for instance, polarizes arranged in a cross nicol relationship i.e. with their polarizing directions being crossing each other are disposed on the upper and the lower surfaces of the glass plates, the liquid crystal cell thus arranged functions as a liquid crystal optical modulation device of which optical characteristics vary depending upon the polarity of an applied voltage.

A surface-stabilized-type ferroelectric liquid crystal cell in a bistable alignment state used in the liquid crystal device of the present invention may be made sufficiently thin. As the liquid crystal layer is sufficiently thin (e.g., 0.1-3 μm), the helical structure of the liquid crystal molecules will be unwound even under no application of electrical field to become a nonhelical structure as shown in FIG. 16, whereby its dipole moment assumes either Pa directed upward (164a) or Pb directed downward (164b), thus forming a bistable state. When an electrical field Ea or Eb with different polarity exceeding a certain threshold value is applied to such a cell as shown in FIG. 16, the dipole moment will change its direction upwardly 164a or downwardly 164b corresponding to the electrical field vector Ea or Eb, whereby the liquid crystal molecules become oriented to either one of the first stable state 163a or the second stable state 163b, correspondingly.

Use of such a ferroelectric liquid crystal as the optical modulating device gives principally two advantages. Firstly, the response speed is extremely rapid, and secondly, alignment of the liquid crystal molecules has bistability. To describe about the second point by referring to, for example, FIG. 16, application of an electrical field Ea makes liquid crystal molecules oriented to the first stable state 163a, which is stably retained even if the electrical field is removed. On the other hand, when an electrical field Eb in the opposite direction is applied, the liquid crystal molecules are oriented to the second stable state 163b to change the directions of the molecules, which state is also stably retained even if the electrical field is removed. Also, unless the electrical field Ea or Eb given exceeds a certain threshold value, the respective alignment states are also maintained.

Hereinbelow, the present invention will be explained by way of representative Examples and Comparative Examples.

EXAMPLE 1

Two 1.1 mm-thick glass plates each provided with a 1000 Å-thick ITO film were provided, and each glass plate was further coated with a 3 wt. % solution of an alicyclic polyimide film-forming solution ("SUN-EVER 150" (trade name), available from Nissan Kagaku Kogyo K.K.) in a 3/1 (wt.) mixture of N-methylpyrrolidone/n-butylcellosolve by means of a spinner coater rotating at 3000 rpm for 30 sec., followed by heating for 1 hour at 250° C. for curing to provide a 500 Å-thick film. The coating film was subjected to rubbing in one direction with an acetate fiber-planted cloth and then washed with isopropyl alcohol, followed by drying at 120° C. for 20 min. On one of the two glass plates thus treated, alumina beads of about 1.5 μm in average diameter were dispersed, and the other glass plate was superposed thereon so that the rubbing axes provided to the two glass plates were parallel with each other and the rubbing directions were identical to each other to form a blank cell.

Into the cell, a ferroelectric smectic liquid crystal "CS-1014" (trade name, available from Chisso K.K.) was injected, and after sealing, aligned by cooling from isotropic phase to 30° C. at a rate of 0.5° C./hour.

The liquid crystal "CS-1014" showed the following phase transition series in the above-prepared cell:

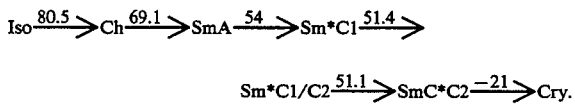

$$\text{Iso} \xrightarrow{80.5} \text{Ch} \xrightarrow{69.1} \text{SmA} \xrightarrow{54} \text{Sm*C1} \xrightarrow{51.4}$$

$$\text{Sm*C1/C2} \xrightarrow{51.1} \text{SmC*C2} \xrightarrow{-21} \text{Cry.}$$

Thus, in the cell, a C2 alignment domain was stably formed in the temperature range of about 50° C. to −20° C. with good monodomain formation characteristic.

The experiments were thereafter carried out at 25° C.

The above-prepared liquid crystal cell was sandwiched between a pair of right-angle cross nicol polarizers and then supplied with a pulse of 50 μsec and 30 V. Then, the right-angle cross nicols were set at the extinction position (to provide the darkest state), and the transmittance of the cell at that time was measured by a photomultiplier. Then, a pulse of 50 μsec and −30 V was applied to the cell to provide a bright state, and the transmittance at that time was measured in the same manner. As a result, the transmittance in the darkest state was 1.0% and the transmittance in the bright state was 8.0%, so that a contrast of 8 was obtained.

The above liquid crystal cell was then subjected to an impact durability test by means of a dropping durability tester ("DT-50" (trade name), mfd. by Yoshida Seiki K.K.). In the test, the dropping impact was increased successively from a minimum value of 20 G (G: gravitational acceleration (=9.8 m/sec$^2$)) by a unit increment of 10 G. As a result, the above liquid crystal cell of this Example caused no alignment disorder even after applying a dropping impact of 80 G and showed a similar switching characteristic as before when supplied with the same driving pulses as those described above.

EXAMPLES 2–6

Ferroelectric smectic liquid crystal cells were prepared in the same manner as in Example 1 except that alignment control film materials and liquid crystal materials shown in the following Table 1 were used.

The respective cells were subjected to the same tests as in Example 1, whereby the contrast and durability data shown in Table 2 were obtained.

TABLE 1

| Example | Alignment control film | Liquid crystal |
|---|---|---|
| 2 | "Sun-Ever 150" (trade name) (Nissan Kagaku Kogyo K.K) | "CS-1011" (trade name) (FLC*, available from Chisso K.K.) |
| 3 | "SE 4110" (trade name) (alicyclic polyamide, available from Nissan Kagaku Kogyo K.K.) | "CS-1014" (trade name) (FLC*, available from Chisso K.K.) |
| 4 | "SE 4110" | "CS-1011" |
| 5 | "JIG-1" (trade name) (alicyclic polyamide, available from Nihon Gosei Gomu K.K.) | "CS-1014" |
| 6 | "LP-64" (trade name) (aromatic polyamide, available from Toray K.K.) | "CS-1014" |

*FLC in the Table denotes a ferroelectric smectic liquid crystal.

TABLE 2

(at 25° C.)

| | Transmittance | | Contrast | |
|---|---|---|---|---|
| Example | Darkest state | Bright state | (in memory state) | Impact durability |
| 2 | 0.9(%) | 8.9(%) | 9.9 | Good* |
| 3 | 0.9 | 8.0 | 8.9 | Good* |
| 4 | 1.0 | 8.5 | 8.5 | Good* |
| 5 | 1.2 | 8.0 | 6.7 | Good* |
| 6 | 0.9 | 8.9 | 9.9 | Good* |

*No deterioration in alignment was observed even after application of an impact of 80 G in the dropping test.

The phase transition series of the respective cells were examined, whereby the results shown in the following Table 3 were obtained.

TABLE 3

(Data in the Table are in °C.)

| Example | Iso | Ch | SmA | Sm*C1 | Sm*C1/C2 | Sm*C2 | Cry. |
|---|---|---|---|---|---|---|---|
| 2 | 91 | 78 | 55 | 52 | | 50 | <0 |
| 3 | 80.5 | 69.1 | 54 | 52 | | 51 | −20 |
| 4 | 91 | 78 | 55 | 53 | | 51 | <0 |
| 5 | 80.5 | 69.1 | 54 | 52 | | 51 | −20 |
| 6 | 80.5 | 69.1 | 54 | 53 | | 51 | −20 |

The data in Table 3 show that the Sm*C1-Sm*C1/C2 phase transition temperature and the Sm*C1/C2-Sm*C2 phase transition temperature slightly vary for the respective cells even if the same liquid crystal is used.

The above cells of Examples 1–6 were then respectively supplied with a pulse of 50 τsec and 30 V, followed by setting of the right-angle cross nicols to the extinction position, whereby each cell provided a black state. Then, the respective cells were supplied with a pulse of 50 μsec and −30 V, followed again by setting of the right-angle cross nicols to the extinction position, whereby each cell again provided a black state. All the measurements were effected at 25° C.

Comparative Examples 1–5

Ferroelectric smectic liquid crystal cells were prepared in the same manner as in Example 1 except that alignment control film materials and liquid crystal materials shown in the following Table 4 were used.

The respective cells were subjected to the same tests as in Example 1, whereby the contrast and durability data shown in Table 5 were obtained.

TABLE 4

| Comparative Example | Alignment control film | Liquid crystal |
|---|---|---|
| 1 | "SP-710" (trade name) (aromatic polyamide, available from Toray K.K.) | "CS-1017" (trade name) (FLC, available from Chisso K.K.) |
| 2 | "SP-710" | "CS-1018" (trade name) (FLC, available from Chisso K.K.) |
| 3 | "X-419B" (trade name) (Polyamide, available from Nitto Denko K.K.) | "CS-1017" |
| 4 | "X-419B" | "CS-1017" |
| 5 | "X-419B" | "CS-1018" |
|   | "X-419B" | "CS-1018" |

TABLE 5

| | (at 25° C.) | | | |
|---|---|---|---|---|
| | Transmittance | | Contrast | |
| Com. Example | Darkest state | Bright state | (in memory state) | Impact durability |
| 1 | 2.3(%) | 7.5(%) | 3.3 | <30G* |
| 2 | 3.0 | 8.0 | 2.7 | <40G* |
| 3 | 3.3 | 8.2 | 2.5 | <30G* |
| 4 | 3.5 | 8.0 | 2.3 | <30G* |
| 5 | 3.2 | 8.2 | 2.6 | <50G* |

*Remarkable alignment disorder occurred when the indicated magnitude of impact was added in the dropping test.

The phase transition series of the respective cells were examined, whereby the results shown in the following Table 6 were obtained.

TABLE 6

| | (Data in the Table are in °C.) | | | | | |
|---|---|---|---|---|---|---|
| Com. Example | Iso | Ch | SmA | Sm*C1 | Sm*C1/C2 | Sm*C2 Cry. |
| 1 | 66.4 | 62.5 | 52.8 | — | — | <0 |
| 2 | 74.5 | 71.7 | 58 | — | — | <0 |
| 3 | 66.4 | 62.5 | 52.8 | — | — | <0 |
| 4 | 74.5 | 71.7 | 58 | — | — | <0 |
| 5 | 80.5 | 69.1 | 54 | — | — | <0 |

As shown in Table 6, no Comparative Example cells showed a temperature range for yielding an Cm*C2 sub-phase until the temperature reached below 0° C.

The above cells of Comparative Examples 1–5 were then respectively supplied with a pulse of 50 μsec and 30 V, followed by setting of the right-angle across nicols to the extinction position, whereby each cell provided a blue state. Then, the respective cells were supplied with a pulse of 50 μsec and −30 V, followed again by setting of the right-angle cross nicols to the extinction position, whereby each cell again provided a blue state. Thus, these cells of comparative cells all provided different appearances from those of the cells of Examples 1–6 in the two extinction states, thus showing differences in alignment state. All the measurements were effected at 25° C.

Comparative Example 6

A ferroelectric smectic liquid crystal cell was prepared in the same manner as in Example 1 except that a pair of substrates treated in the same manner as in Example 1 were fixed to each other so that the rubbing axes provided to the two substrates were parallel with each other and reverse in direction. The liquid crystal cell was subjected to the same tests as in Example 1, whereby results shown in the following Table 7 were obtained.

TABLE 7

| | (at 25° C.) | | | |
|---|---|---|---|---|
| | Transmittance | | Contrast | |
| Com. Example | Darkest state | Bright state | (in memory state) | Impact durability |
| 6 | 1.9% | 9.2% | 4.8 | <20G* |

*Remarkable alignment disorder occurred when an impact of 20G was applied in the dropping test.

The above cell of Comparative Example 6 was supplied with a pulse of 50 μsec and 30 V, followed by setting of the right-angle cross nicols to the extinction position, whereby the cell showed a black state. Then, the cell was supplied with a pulse of 50 μsec and −30 V, followed again by setting of the right-angle cross nicols to the extinction position, whereby the cell showed a blue state at this time (at 25° C.). Thus, the cell showed a difference in appearance from the cells of Examples 1–6 in the two extinction states, thus showing a difference in alignment state.

Most of the alignment disorders caused in the cells of Comparative Examples 1–6 were in sanded texture, and the liquid crystal cells thereafter failed to cause switching by application of pulses of 50 μsec and 30 V or −30 V.

Further, the cells of Examples 1 and 2 were subjected to measurement of the pretilt angle θpr in the smectic A phase. The results are shown in the following Table 8.

TABLE 8

| Example | Pretilt angle |
|---|---|
| 1 | 4.6 degrees |
| 2 | 2.6 degrees |

As is understood from the above Examples and Comparative Examples, the present invention provides a ferroelectric smectic liquid crystal device having an improved impact stability and providing a display of an improved contrast.

In a preferred embodiment of the present invention, by using a specifically selected polyimide alignment film as will be described above, it is possible to have the area S of a region in the above-mentioned C1 alignment state of chiral smectic liquid crystal occupy at least 95%, preferably at least 98%, particularly preferably at least 99%, of the effective display region. In other words, it has become possible to realize an alignment state accompanied with very few alignment defects and providing an improved contrast. Particularly, by increasing the transmittance at the time of displaying a white state, it has become possible to realize an application to color display.

Further, according to the present invention, it is possible to realize an alignment state of chiral smectic liquid crystal wherein liquid crystal molecules are inclined (pre-tilted) at an angle of at least 3 degrees, preferably 8–30 degrees, with respect to the surface of a polyimide film as described below in the vicinity of the polyimide film surfaces.

It is further possible according to the present invention to realize an alignment state wherein the above-mentioned smectic layers are inclined at an angle of at least 95 degrees, preferably 100–120 degrees, in the same rotational sense as the inclination of the liquid crystal molecules in the vicinity of the respective polyimide alignment surfaces so that the smectic layers are unidirectionally bent substantially throughout the effective display region corresponding to the inclination of the layers.

According to our experiments, by using an alignment method using a specific polyimide alignment film treated by rubbing as explained with reference to Examples described hereinafter, there has been realized an alignment state which provides a large optical contrast between a bright and a dark state, particularly with respect to non-selected pixels during multiplexing drive as disclosed in U.S. Pat. No. 4,655,561, etc., and also is free from a delay in optical response leading to a problem of after-image in a display at the time of switching during such multiplexing drive.

The fluorine-containing polyimide may preferably be selected from those having structural units represented by the following formulas (I)–(VIII):

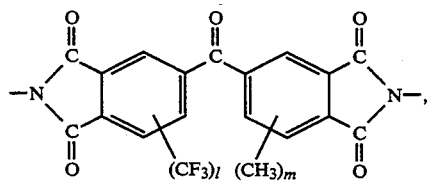
(I)

wherein l is an integer of 1–3 and m is 0 or an integer of 1–3;

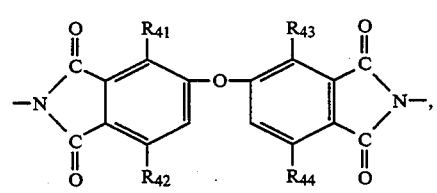
(II)

wherein $R_{21}$ and $R_{22}$ are respectively hydrogen atom, fluorine atom or $CH_3$ with proviso that at least one of $R_{21}$ and $R_{22}$ is fluorine atom or $-CF_3$;

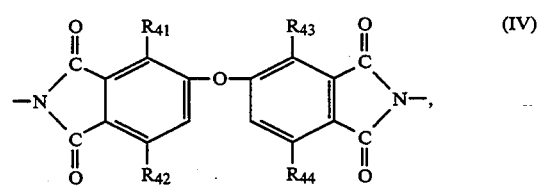
(III)

wherein $R_{31}$, $R_{32}$, $R_{33}$ and $R_{34}$ are respectively hydrogen atom, fluorine atom or $-CF_3$ with proviso that at least one of $R_{31}$, $R_{32}$, $R_{33}$ and $R_{34}$ is fluorine atom or $-CF_3$;

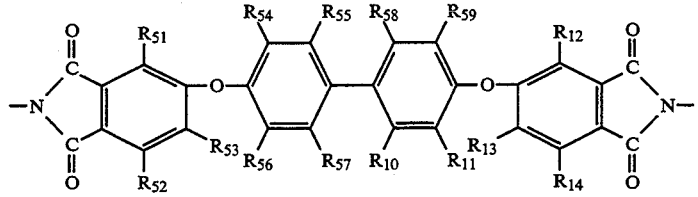
(IV)

wherein $R_{41}$, $R_{42}$, $R_{43}$ and $R_{44}$ are respectively hydrogen atom, fluorine atom or $-CF_3$ with proviso that at least one of $R_{41}$, $R_{42}$, $R_{43}$ and $R_{44}$ is fluorine atom or $-CF_3$;

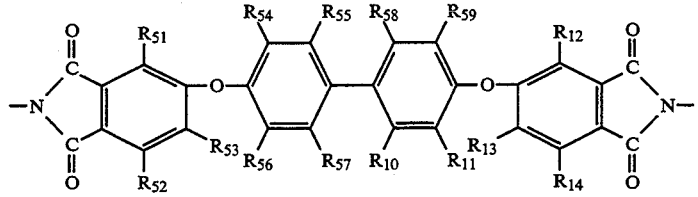
(V)

wherein $R_1$–$R_{59}$ and $R_{10}$–$R_{14}$ are respectively hydrogen atom, fluorine atom or $-CF_3$ with proviso that at least one of $R_{51}$–$R_{59}$ and $R_{10}$–$R_{14}$ is fluorine atom or $-CF_3$;

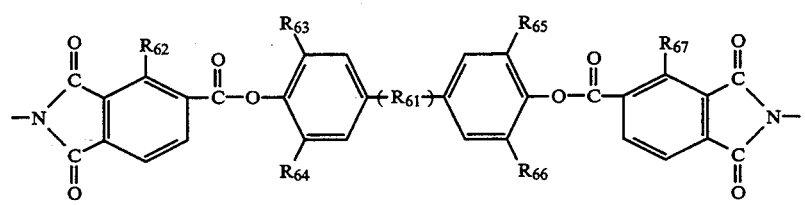
(VI)

wherein
$R_{61}$ is $-\underset{\underset{CF_3}{|}}{\overset{\overset{CF_3}{|}}{C}}-$, $-\underset{\underset{CF_3}{|}}{\overset{\overset{CF_3}{|}}{C}}-$ or $-(CF_2)_{n1}-$, $n_1$ is 0 or an integer of 1–7; $R_{62}$ and $R_{67}$ are respectively hydrogen atom or —$CF_3$, $R_{63}$–$R_{66}$ are respectively hydrogen atom, alkyl group, halogen atom or —$CF_3$ with proviso that at least one of $R_{62}$–$R_{67}$ is —$CF_3$ when $n_1=0$;

wherein l8, m8 and n8 are respectively 0 or an integer of 1–3 with proviso that $l8+m8+n8 \geq 1$.

The fluorine-containing polyimide film used in the present invention may be obtained by synthesizing a polyamide acid through condensation reaction between

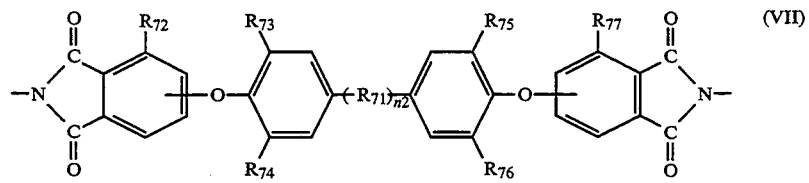

wherein

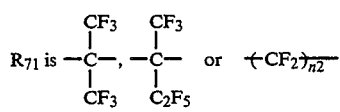

$n_2$ is 0 or an integer of 1–7, $R_{72}$ and $R_{77}$ are respectively hydrogen atom or —$CF_3$, $R_{73}$–$R_{76}$ are respectively hydrogen atom, alkyl group, halogen atom or —$CF_3$ with proviso that at least one of $R_{72}$–$R_{76}$ is —$CF_3$ when $n_1=0$, and a carboxylic acid anhydride and a diamine and subjecting the polyamide acid to cyclization under heating.

Examples of carboxylic acid anhydrides suitably used for providing the polyimides having a structural unit represented by the above-mentioned general formulae (I)–(VIII) may include the following:

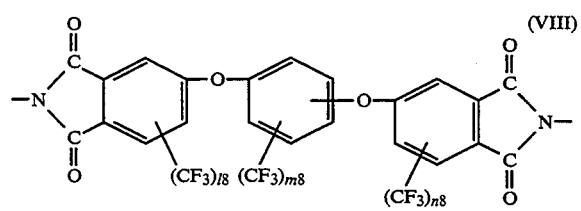

For polyimides of the formula (I):

I-(1): 5,5'-bis(trifluoromethyl)-3,3'-4,4'- tetracarboxybenzophenone

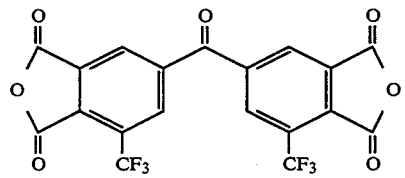

I-(2): 2,2',5,5'-tetra(trifluoromethyl)-3,3'-, 4,4'-tetracarboxybenzophenone

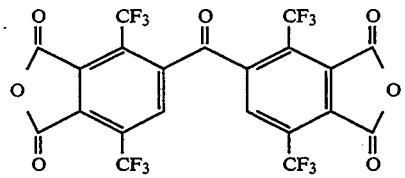

For polyimides of the formula (II):

II-(1): trifluoromethyl-pyromellitic anhydride

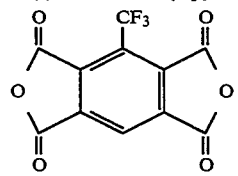

II-(2): bis(trifluoromethyl)pyromellitic anhydride

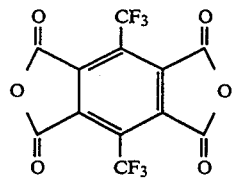

II-(3): fluoropyromellitic anhydride

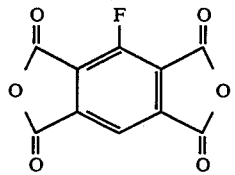

For polyimides of the formula (III):

III-(1): 5,5'-bis(trifluoromethyl)-3,3',4,4'-tetracarboxybiphenyl anhydride

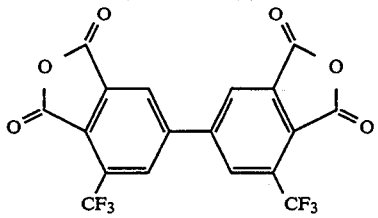

III-(2): 2,2'-,5,5'-tetrakis(trifluoromethyl)-3,3',4,4'-tetracarboxybiphenyl anhydride

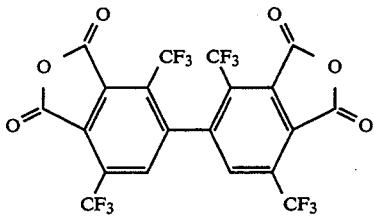

III-(3): 5,5'-difluor-3,3',4,4'-tetracarboxy-biphenyl anhydride

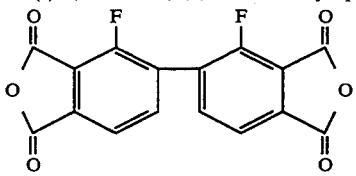

For polyimides of the formula (IV):

IV-(1): 5,5'-bis(trifluoromethyl)-3,3',4,4'-tetracarboxydiphenyl ether anhydride

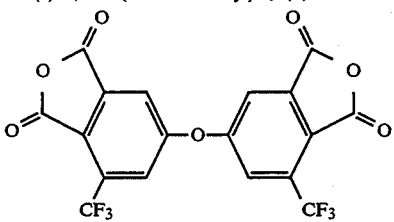

IV-(2): 2,2',5,5'-tetra(trifluoromethyl)-3,3',4,4'-tetracarboxydiphenyl ether anhydride

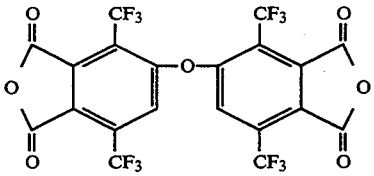

IV-(3): 2.2'-bis(fluoromethyl)-3,3',4,4'-tetra-carboxydiphenyl ether anhydride

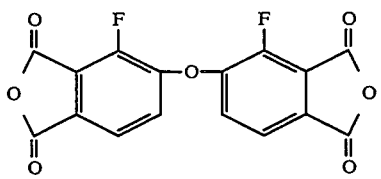

IV-(4): 5,5'-bis(trifluoromethyl)-2,2',3,3'-tetracarboxydiphenyl ether anhydride

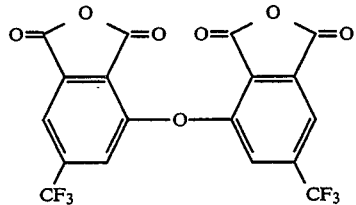

For polyimides of the formula (V):

V-(1): bis(dicarboxyphenoxy)-bis(trifluoromethyl)-biphenyl

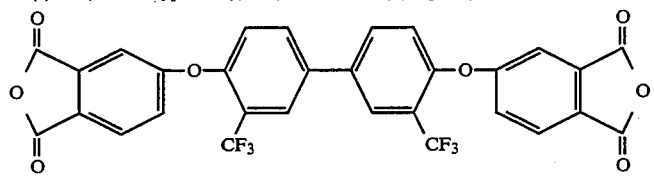

V-(2): bis(dicarboxyphenoxy)-tetrakis(trifluoro-methyl)biphenyl

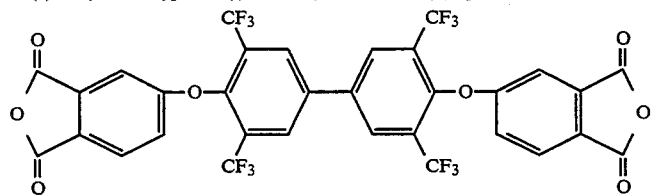

V-(3): bis[(trifluoromethyl)dicarboxyphenoxy]-biphenyl

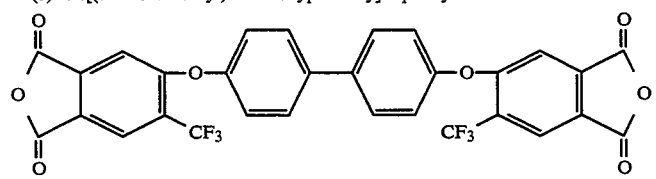

V-(4): bis[(fluoro)dicarboxyphenoxy]biphenyl

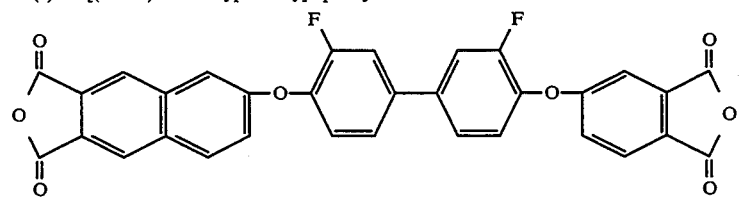

For polyimides of the formula (VI):

VI-(1): 2,2-bis[4-(3,4-dicarboxybenzoyloxy)-3-bromophenyl]hexafluoropropane anhydride

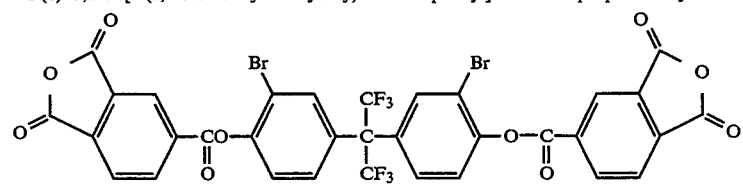

VI-(2): 2,2-bis[4-(3,4-dicarboxybenzoyloxy)-3,5-dibromophenyl]hexafluoropropane anhydride -continued

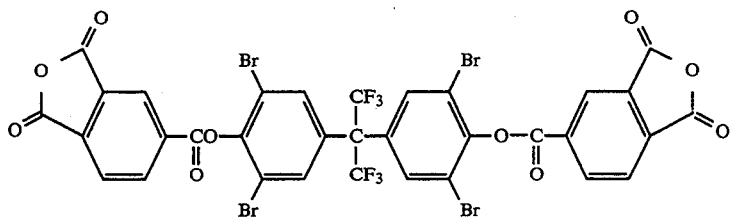

VI-3: 2,2-bis[4-(3,4-dicarboxybenzoyloxy)-3,5-dimethylphenyl]hexafluoropropane anhydride

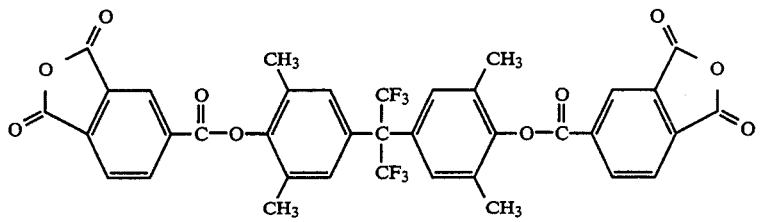

VI-(4): 2,2-bis[4-(3,4-dicarboxybenzoyloxy)phenyl]-octafluorobutane anhydride

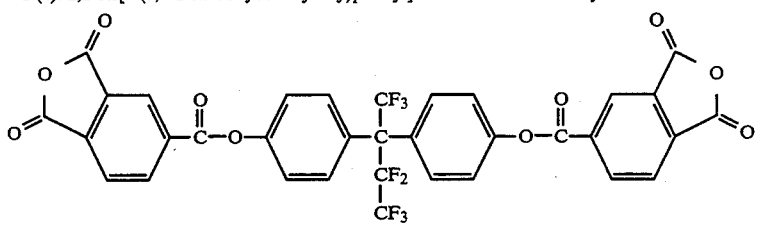

VI-(5): 2,2-bis[4-(2-trifluoromethyl-3,4-dicarboxybenzoyloxy)phenyl]hexafluoropropane anhydride

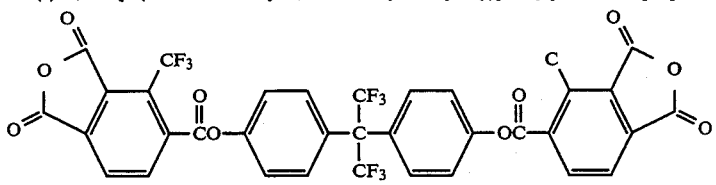

VI-(6): 1,3-bis,[4-(3,4-dicarboxybenzoyloxy)phenyl]-hexafluoropropane anhydride

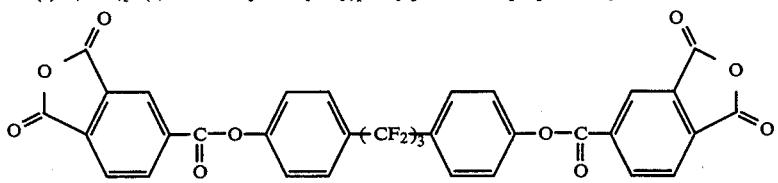

VI-(7): 1,5-bis[4-(3,4-dicarboxybenzoyloxy)phenyl]-decafluoropentane anhydride

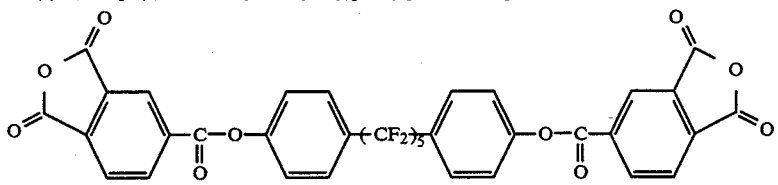

VI-(8): 1,6-bis[4-(3,4-dicarboxybenzoyloxy)phenyl]-dodecafluorohexane anhydride

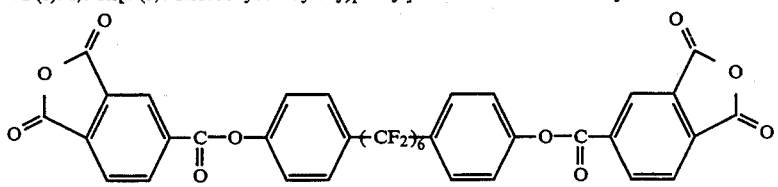

VI-(9): 1,7-bis[4-(3,4-dicarboxybenxyloxy)phenyl]-tetradecafluoroheptane anhydride

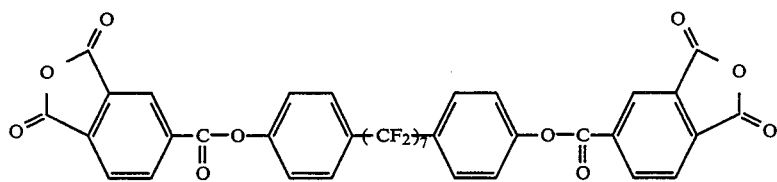

VI-(10): 1,5-bis[4-(3,4-dicarboxybenzoyloxy)-3,5-dibromophenyl]decafluoropentane anhydride

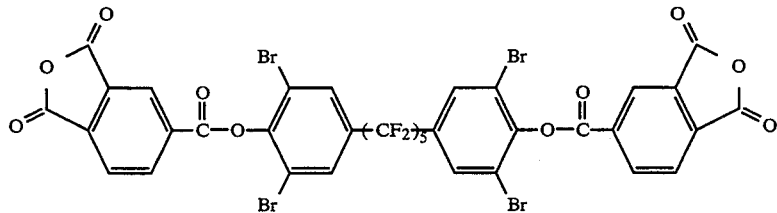

VI-(11): 1,5-bis[4-3,4-dicarboxybenzoyloxy)-3,5-bistrifluoromethylphenyl]decafluoropentane anhydride

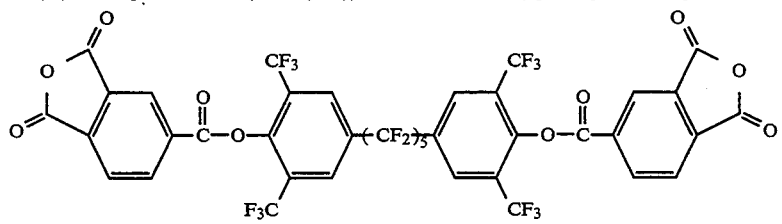

VI-(12): 1,5-bis[4-(2-trifluoromethyl-3,5-dicarboxybenzoyloxyphenyl]decafluoropentane anhydride

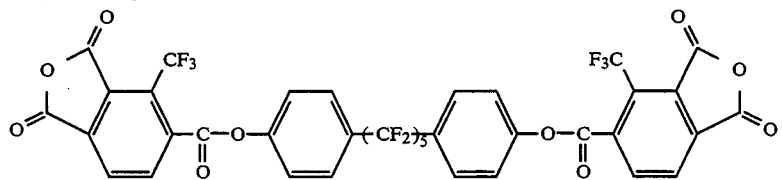

For polyimides of the formula (VII)

VII-(1): 1,5-bis[4-(3,4-dicarboxyphenoxy)phenyl]-decafluoropentane anhydride

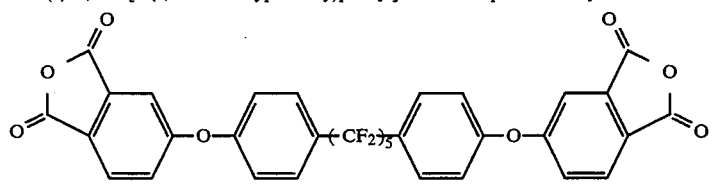

VII-(2): 1,6-bis[4-(3,4-dicarboxyphenoxy)phenyl]-dodecafluorohexane anhydride

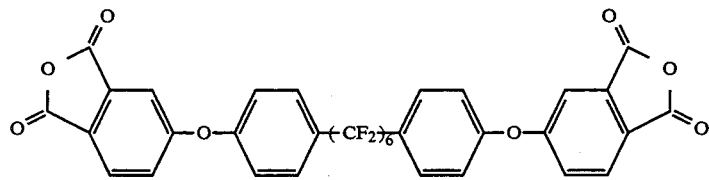

VII-(3): 1,7-bis[4-(3,4-dicarboxyphenoxy)phenyl]-tetradecafluoroheptane anhydride

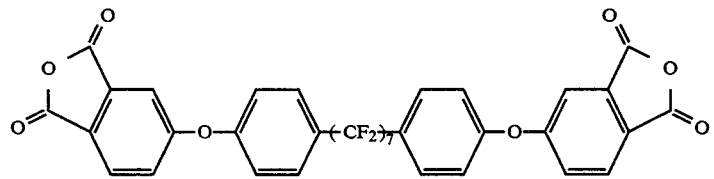

VII-(4): 1,5-bis[4-(3,4-dicarboxyphenoxy)-3,5-dibromophenyl]decafluoropentane anhydride

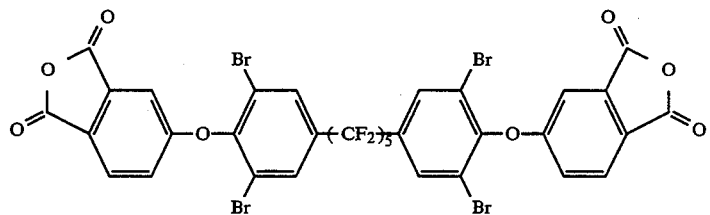

VII-(5): 1,5-bis[4-(3,4-dicarboxyphenoxy)-3,5-bistrifluoromethylphenyl]decafluoropentane anhydride

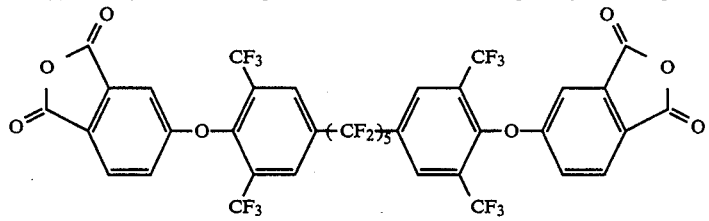

VII-(6): 1,5-bis[4-(3,4-dicarboxy-2-trifluoro-methylphenoxy)phenyl]decafluoropentane anhydride

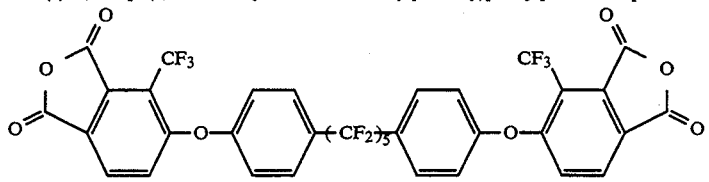

VII-(7): 2,2-bis[4-(3,4-dicarboxyphenoxy)-3-bromophenyl]hexafluoropropane anhydride

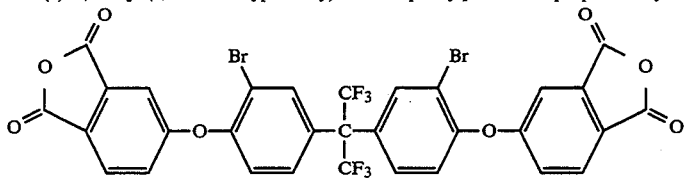

VII-(8): 2,2-bis[4-(3,4-dicarboxyphenoxy)-3,5-dibromophenyl]hexafluoropropane anhydride

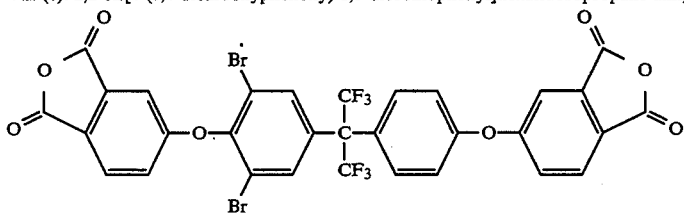

VII-(9): 2,2-bis[4-(3,4-dicarboxyphenoxy)-3,5-dimethylphenyl]hexafluoropropane anhydride

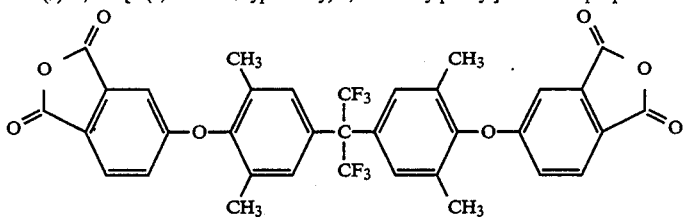

VII-(10): 2,2-bis[4-(3,4-dicarboxyphenoxy)phenyl]-octafluorobutane anhydride

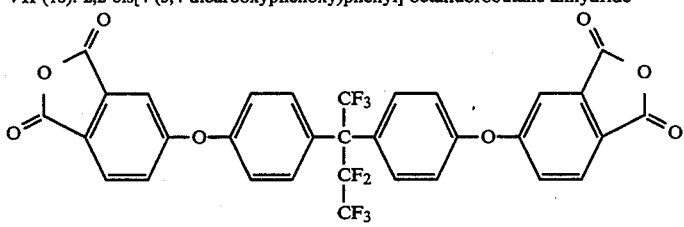

VII-(11): 2,2-bis[4-(3,4-dicarboxy-2-drifluoro-methylphenoxy)phenyl]hexafluoropropane anhydride -continued

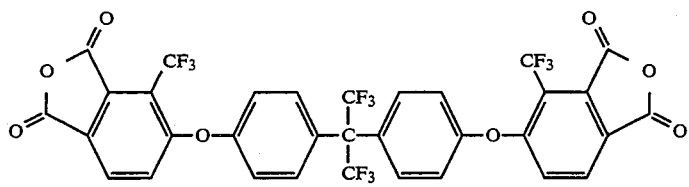

VII-(12): 1,3-bis[4-(3,4-dicarboxyphenoxy)phenyl]-hexafluoropropane anhydride

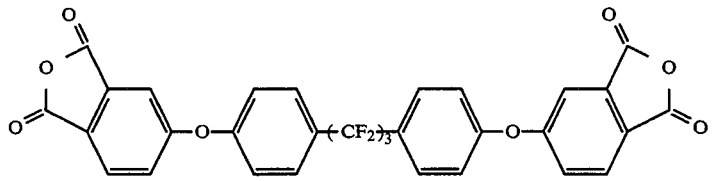

VII-(13): 2,2-bis[4-(3,4-dicarboxyphenoxy)phenyl]-hexafluoropropane anhydride

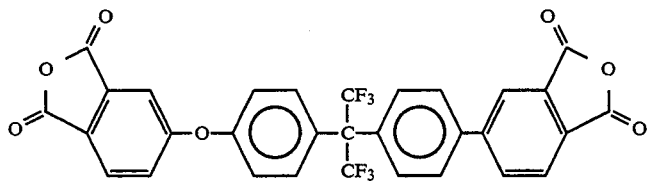

For polyimides of the formula (VIII)

VIII-(1): bis(dicarboxyphenyl)-trifluoromethyl-benzene anhydride

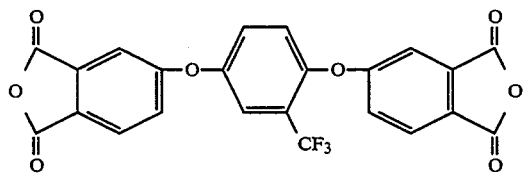

VIII-(2): bis(dicarboxyphenoxy)-bis(trifluoromethyl)benzene anhydride

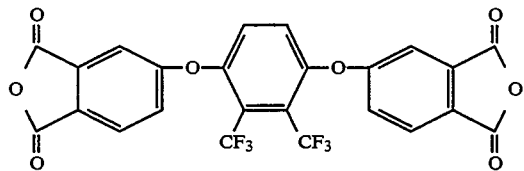

VIII-(3): bis(dicarboxyphenoxy)-tetrakis(trifluoromethyl)benzene anhydride

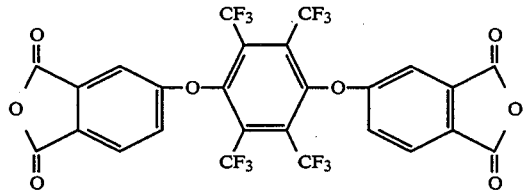

VIII-(4): bis[(trifluoromethyl)dicarboxyphenoxy]benzene anhydride

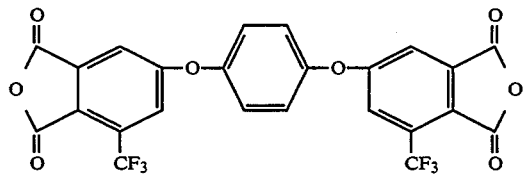

VIII-(5): bis[(trifluoromethyl)dicarboxyphenoxy]-(trifluoromethyl)benzene

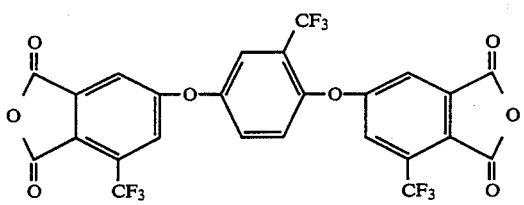

Examples of the diamine used in the present invention may include: m-phenylenediamine, p-phenylenediamine, m-xylenediamine, p-xylenediamine, 4,4'-diaminodiphenyl ether, 4,4'-diaminodiphenylmethane, 3,3'-dimethyl-4,4'-diaminodiphenylmethane, 3,3',5,5'-tetramethyl-4,4'-diaminodiphenylmethane, 2,2'-bis(4-aminophenyl)propane, 4,4'-methylenedianiline, benzidine, 4,4'-diaminodiphenyl sulfide, 4,4'-diaminodiphenyl sulfone, 1,5-diaminonaphthalene, 3,3'-dimethylbenzidine, and 3,3'-dimethoxybenzidine. In addition to the above diamines, fluorine-containing diamines may also be used, examples of which may include: 2,2-bis[4-(4-aminophenoxy)phenyl]hexafluoropropane, 2,2-bis[4-(3-aminophenoxy)phenyl]hexafluoropropane, 2,2-bis[4-(2-aminophenoxy)phenyl]hexafluoropropane, 2,2-bis[4-(2-aminophenoxy-3,5-dimethylphenyl]hexafluoropropane, p-bis(4-amino-2-trifluoromethylphenoxy)benzene, 4,4'-bis(4-amino-2-trifluoromethylphenoxy)biphenyl, 4,4'-bis(4-amino-3-trifluoromethylphenoxy)biphenyl, 4,4'-bis(4-amino-2-trifluoromethylphenoxy)diphenyl sulfone, 4,4'-bis(3-amino-5-trifluoromethylphenoxy)diphenyl sulfone, 2,2-bis[4-(4-amino-2-trifluoromethylphenoxy)phenyl]hexafluoropropane, and 4,4'-bis[(4-aminophenoxy)phenyl]hexafluoropropane.

In the present invention, the above-mentioned carboxylic acids and/or diamines can be used in mixture of two or more species.

Further, in the present invention, the following carboxylic anhydrides can be used in combination with the above-mentioned fluorine-containing carboxylic anhydride to provide a polyimide copolymer: e.g., pyromellitic anhydride, naphthalenetetracarboxylic anhydride, 3,3',4,4'-diphenyltetracarboxylic anhydride, 1,2,5,6-naphthalenetetracarboxylic anhydride, 2,2',3,3'-diphenyltetracarboxylic dianhydride, thiophene-2,3,4,5-tetracarboxylic anhydride, 2,2-bis(3,4-biscarboxyphenyl)propane anhydride, 3,4-dicarboxyphenyl sulfone anhydride, perylene-3,4,9,10-tetracarboxylic anhydride, bis(3,4-dicarboxyphenyl)ether anhydride and 3,3',4,4'-benzophenonetetracarboxylic anhydride.

In order to form a film of the polyimide on a substrate, a solution of a polyamide acid as a precursor of the polyimide in a solvent, such as dimethylformamide, dimethylacetoamide, dimethylsulfoxide or N-methylpyrrolidone at a concentration of 0.01–40 wt. % may be applied onto the substrate by spinner coating, spray coating, roller coating, etc., and heated at 100°–350° C., preferably 200°–300° C., to cause dehydro-cyclization. The thus-formed polyimide film may be rubbed with a cloth, etc. The polyimide film may be formed in a thickness of, e.g., 30 Å–1 μm, preferably 200–2000 Å, so as to also function as an insulating film. In this case, the insulating films 13a and 13b can be omitted. Further, in case of forming the polyimide film on the insulating film 13a or 13b, the polyimide film thickness may be set to 200 Å or less, preferably 100 Å or less.

The liquid crystal material used in the present invention may preferably be one showing a phase transition from isotropic phase through cholesteric phase and smectic A phase into chiral smectic C phase in the course of temperature decrease. Particularly, a chiral smectic liquid crystal showing a helical pitch of 0.8 82 m or longer in cholesteric phase (measured at a mid temperature in the cholesteric range). Preferred examples of such a liquid crystal material may include liquid crystal materials (1)–(5) below comprising the following liquid crystals "LC-1", "80B" and "80SI*" in the indicated proportions by weight.

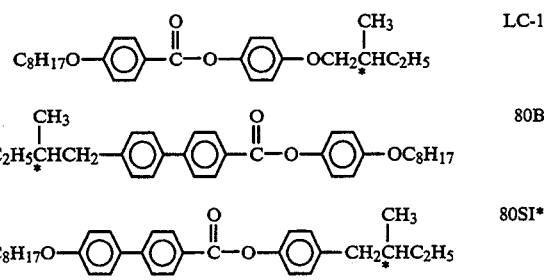

Figure 1B:
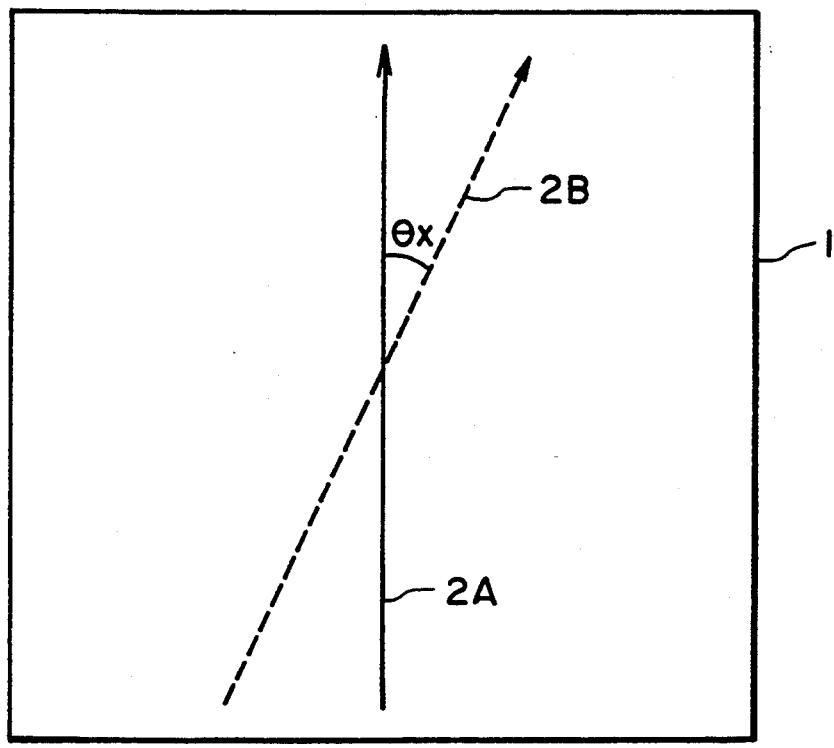

Liquid crystal material
(1) (LC-1)$_{90}$/(80B)$_{10}$
(2) (LC-1)$_{80}$/(80B)$_{20}$
(3) (LC-1)$_{70}$(80B)$_{30}$
(4) (LC-1)$_{60}$/(80B)$_{40}$
(5) (80SI*)$_{100}$ FIG. 1B is a schematic plan view for illustrating another preferred embodiment of the liquid crystal device according to the present invention. The device comprises a pair of substrates including one substrate closer to a viewing position having a rubbing axis provided in the direction of an arrow 2A and the other substrate farther from the viewing position having a rubbing axis in the direction of an arrow 2B which intersects with the rubbing axis 2A at an intersection angle in the range of 2–15 degrees, preferably 3–12 degrees. In a particularly preferred embodiment, the rubbing axis 2A is disposed to form an intersection angle $\theta x$ in the counter-clockwise direction with respect to the rubbing axis 2B.

Figure 18A:
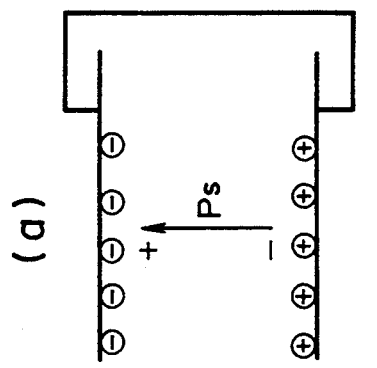
FIGS. 18A and 18B are plan views illustrating tilt angles $\theta$ in a uniform alignment state and a splay alignment state, respectively.
Figure 18A:
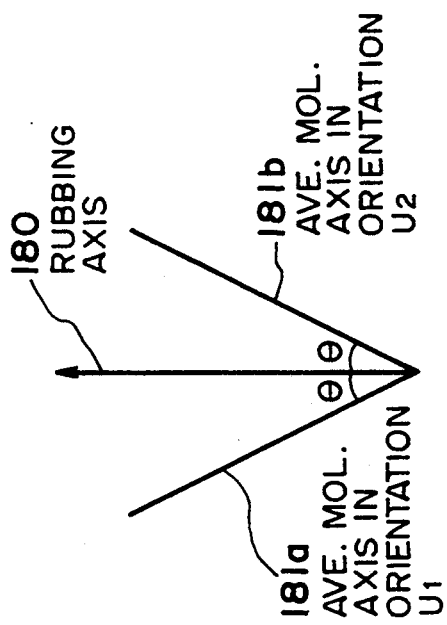
Figure 18B:
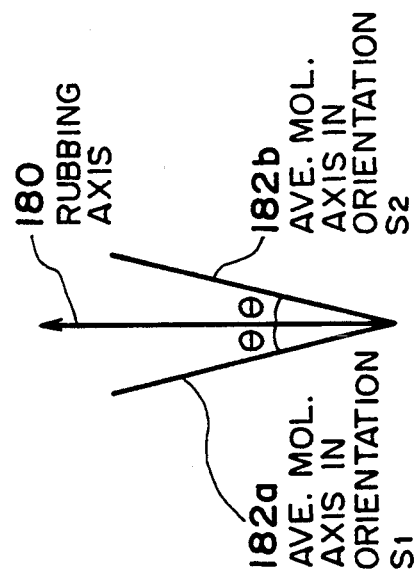
Figure 21:
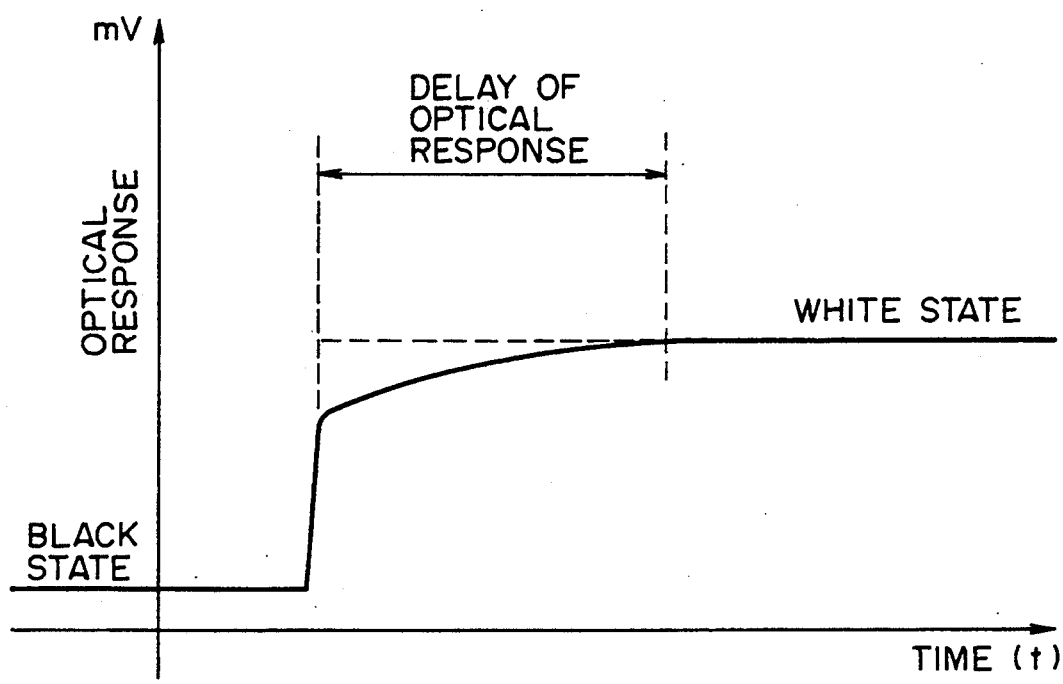
FIGS. 21 and 22 are graphs showing optical response characteristics according to a conventional device and the present invention, respectively.

FIG. 18nA is a schematic plan view illustrating a tilt angle $\theta$ in an alignment state where C-directors 81 assume a state shown in FIG. 8B (referred to as "uniform alignment state"), and FIG. 18B is a schematic plan view illustrating a tilt angle $\theta$ in an alignment state where C-directors 81 assume a state shown in FIG. 8C (referred to as "splay alignment state"). In these figures, reference numeral 180 denotes a rubbing axis provided to the above-mentioned fluorine-containing polyimide film, numeral 181a denotes an average molecular axis in the orientation state $U_1$, numeral 181b denotes an average molecular axis in the orientation state $U_2$, numeral 182a denotes an average molecular axis in the orientation state $S_1$, and numeral 182b denotes an average molecular axis in the orientation state $S_2$. The average molecular axes 181a and 181b can be switched to each other by applying voltages of mutually opposite polarities. Similar switching is caused between the average molecular axes 182a and 182b.

Next, the effectiveness of the uniform alignment state with respect to a delay in optical response (after-image) due to a reverse electric field Vrev is explained.

If the capacitance of an insulating layer constituting a liquid crystal cell is denoted by Ci, the capacitance of a liquid crystal layer is denoted by $C_{LC}$ and the spontaneous polarization of the liquid crystal is denoted by $P_S$, Vrev causing after-image is expressed by the following equation.

$$Vrev = 2P_S/(Ci + C_{LC})$$

Figure 19:
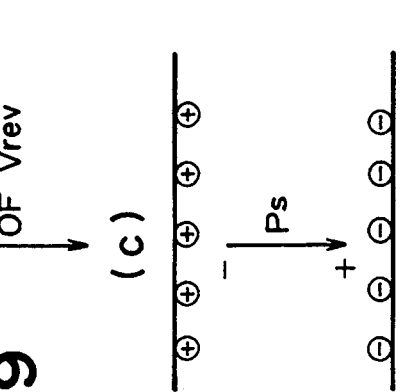
FIG. 19 is a sectional view showing a charge distribution, a direction of a spontaneous polarization $P_S$ and a direction of a reverse electric field Vrev.

FIG. 19 is a schematic sectional view illustrating changes in charge distribution direction of $P_S$ and direction of the reverse electric field in a liquid crystal cell. At FIG. 19(a), there is shown a distribution of $\oplus$ and $\ominus$ charges in a memory state before application of a pulse electric field, where the spontaneous polarization is directed from $\oplus$ charges to $\ominus$ charges. At FIG. 19(b) is shown a state immediately after removal of a pulse electric field, when the direction of the spontaneous polarization $P_S$ is opposite to that shown at FIG. 19(a) (thus, the liquid crystal molecules are inverted from one stable orientation state to the other orientation state) but the distribution of the $\oplus$ and $\ominus$ charges is similar to that shown at FIG. 19(a), so that a reverse electric field Vrev is generated as indicated by an arrow shown at FIG. 19(b). The reverse electric field Vrev disappears in a short time to provide a distribution of $\oplus$ and $\ominus$ charges as shown at FIG. 19(c).

Figure 20:
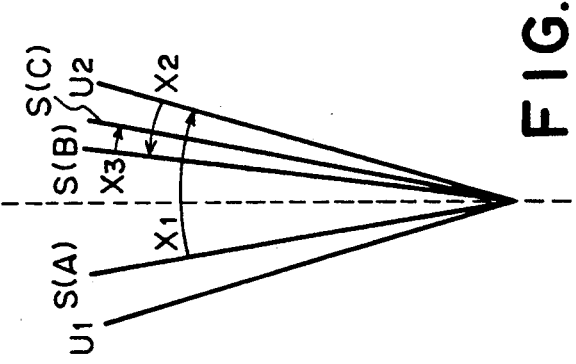
FIG. 20 is a schematic plan view illustrating changes in tilt angle $\theta$ during and after application of an electric field.

FIG. 20 is a plan view showing a change in optical response in a splay alignment state given by a conventional polyimide alignment film in terms of a change in tilt angle $\theta$. Referring to FIG. 20, at the time of application of a pulse electric field, the orientation of liquid crystal molecules is changed from an average molecular axis S(A) in a splay alignment state to be overshot to an average molecular axis $U_2$ in a uniform alignment state close to that providing a maximum tilt angle $\widehat{H}$ along a path denoted by an arrow $X_1$, and immediately after the removal of the pulse electric field, the orientation is changed along a path denoted by an arrow $X_2$ to an average molecular axis S(B) in a splay alignment state providing a decreased tilt angle $\theta$ due to the action of the reverse electric field Vrev shown at FIG. 19(b). Then, as the reverse electric field Vrev attenuates as shown at FIG. 19(c), the orientation is changed along a path denoted by an arrow $X_3$ to an average molecular axis S(C) in a splay alignment state providing a stable orientation state having a somewhat increased tilt angle $\theta$.

Figure 22:
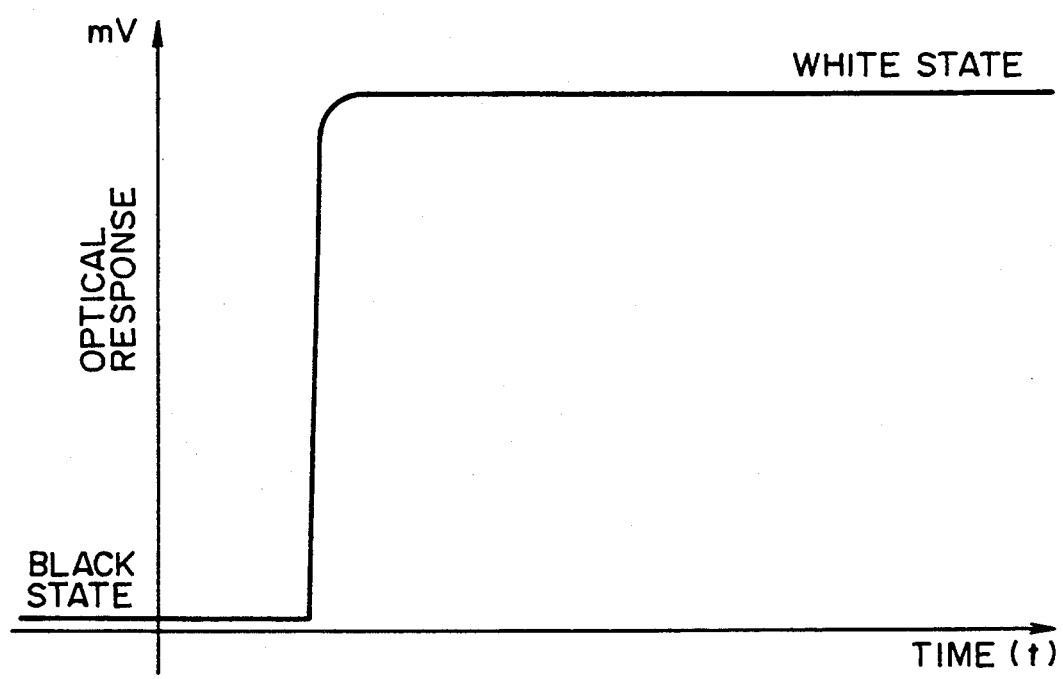

In the alignment state given by using the above-mentioned fluorine-containing polyimide film of the present invention, the average molecular axes S(A), S(B) and S(C) in the splay alignment state shown in FIG. 20 are not caused but it is possible to form an alignment state with an average molecular axis giving a tilt angle $\theta$ which is close to a maximum tilt angle $\widehat{H}$. An optical response at this time according to the present invention is shown in FIG. 22. FIG. 22 shows that a delay in optical response causing after-image is obviated and a high contrast in memory states is caused.

Figure 24:
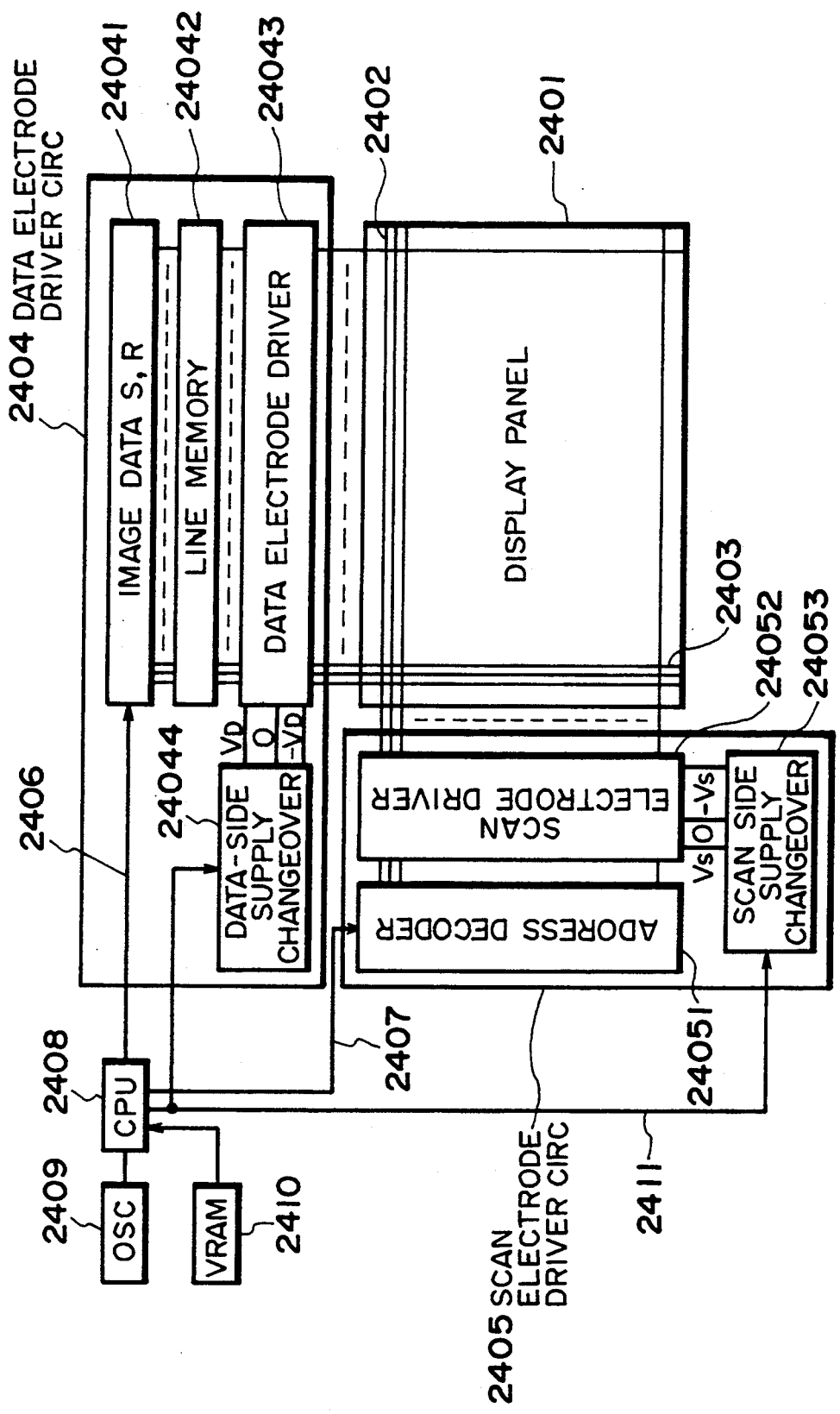
FIG. 24 is a block diagram of a display apparatus constituted by using a device according to the present invention.

FIG. 24 is a block diagram illustrating a structural arrangement of an embodiment of the display apparatus according to the present invention. A display panel 2401 is composed of scanning electrodes 2402, data electrodes 2403 and a ferroelectric liquid crystal disposed therebetween. The orientation of the ferroelectric liquid crystal is controlled by an electric field at each intersection of the scanning electrodes and data electrodes formed due to voltages applied across the electrodes.

The display apparatus includes a data electrode driver circuit 2404, which in turn comprises an image data shift register 24041 for storing image data serially supplied from a data signal line 2406, a line memory 24042 for storing image data supplied in parallel from the image data shift register 24041, a data electrode driver 24043 for supplying voltages to data electrodes 2403 according to the image data stored in the line memory 24042, and a data side power supply changeover unit 24044 for changing over among voltages $V_D$, 0 and $-V_D$ supplied to the data electrodes 2403 based on a signal from a changeover control line 2411.

The display apparatus further includes a scanning electrode driver circuit 2405, which in turn comprises a decoder 24051 for designating a scanning electrode among all the scanning electrodes based on a signal received from a scanning address data line 2407, a scanning electrode driver 24052 for applying voltages to the scanning electrodes 2402 based on a signal from the decoder 24051, and a scanning side power supply changeover unit 24053 for changing over among voltages $V_S$, 0 and $-V_S$ supplied to the scanning electrodes 2402 based on a signal from a changeover control line 2411.

The display apparatus further includes a CPU 2408, which receives clock pulses from an oscillator 2409, controls the image memory 2410, and controls the signal transfer over the data signal line 2406, scanning address data line 2407 and changeover control line 2411.

The display panel 2401 has an effective display region which is an areal region effectively used for display defined within a matrix electrode region constituted by the scanning electrodes 2402 and the data electrodes 2403. Generally, the effective display region occupies substantially the whole area of the matrix electrode region.

Hereinbelow, the present invention will be explained based on Examples.

EXAMPLE 7

Two 1.1 mm-thick glass plates each provided with a 1000 Å-thick ITO film were respectively coated with a 3.0 wt. % solution of a polyamide acid represented by the formula shown below in a mixture solvent of N-methylpyrrolidone/n-butylcellosolve=5/1 by means of a spinner rotating at 3000 rpm for 30 min.

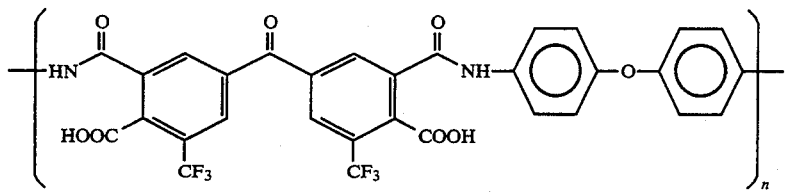

(n (degree of polymerization)=700-2000) After the coating, the film gas subjected to curing under heating at 250° C. for about an hour to form a 450 Å-thick film. The coating film was then rubbed in one direction with a nylon-planted cloth.

On one of the two glass plates thus treated, 1.5 μm alumina beads were dispersed, and the other glass plate was superposed thereon so that their rubbing axes were parallel to each other and disposed in the same direction to form a blank cell.

The blank cell was filled with a ferroelectric smectic liquid crystal ("CS-1014" (trade name), available from Chisso K.K.) under vacuum and, after sealing, was gradually cooled from isotropic phase at a rate of 5° C./hour to 30° C., whereby an alignment was effected. The "CS-1014" liquid crystal in the cell showed the following phase transition series.

$$\text{Iso.} \xrightarrow{80.5°\text{ C.}} \text{Ch.} \xrightarrow{69.1°\text{ C.}} \text{SmA} \xrightarrow{50°\text{ C.}} \text{SmC*}$$

Iso.: isotropic phase,
Ch.: cholesteric phase,
SmA: smectic A phase,
SmC*: chiral smectic C phase.

The experiment thereafter was performed at 25° C.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data was obtained.

Tilt angle $\theta$=15 degrees, transmittance in the brightest state=44%, transmittance in the darkest state=1%, contrast ratio=44:1.

The delay in optical response causing after-image was 0.2 sec or less.

Figure 23:
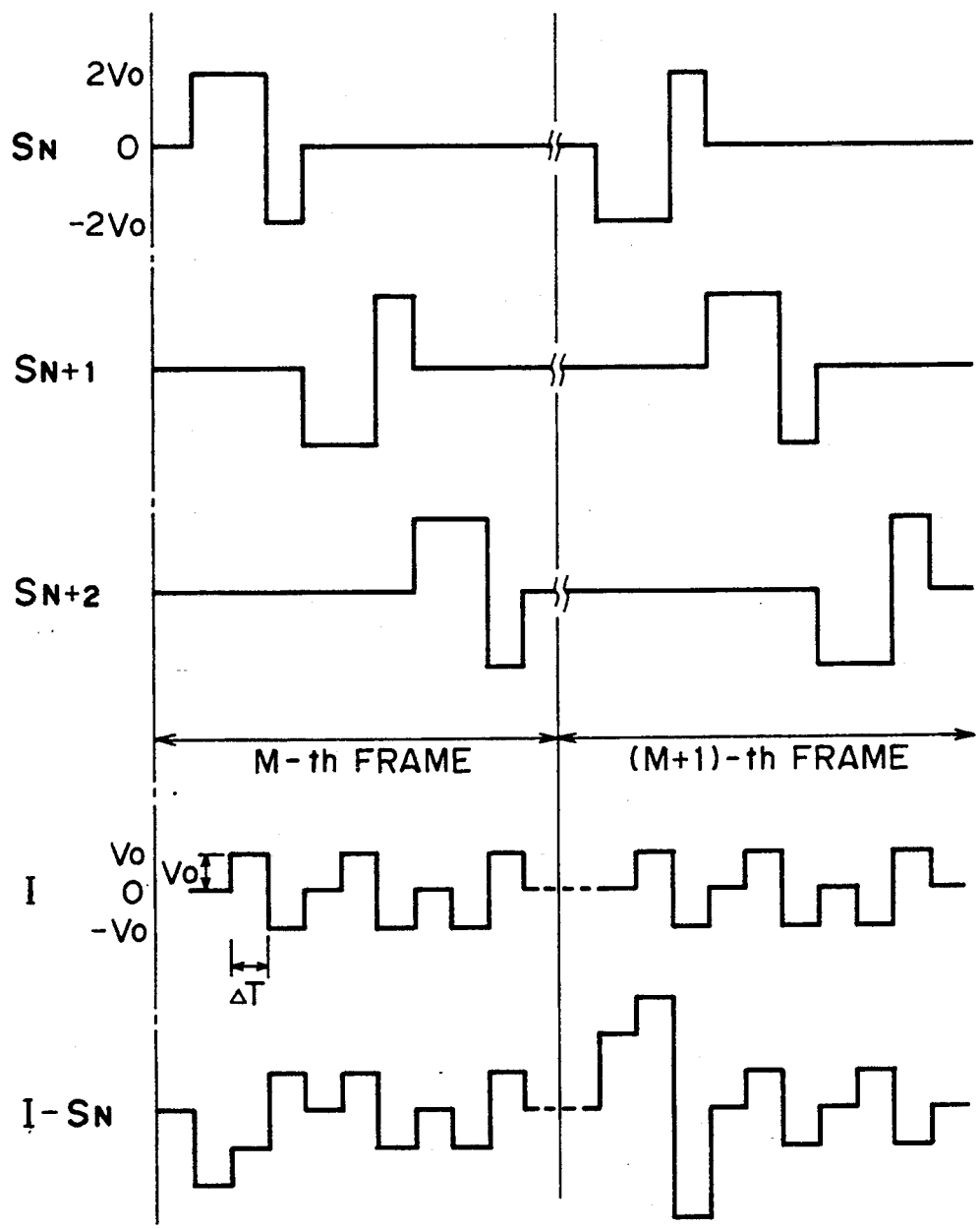
FIG. 23 is a waveform diagram illustrating driving waveforms used in an embodiment of the present invention.

The liquid crystal device was subjected to multiplexing drive for display using driving waveforms shown in FIG. 23, whereby a high-quality display with a high contrast was attained. Further, after an image display of a prescribed character image, the whole picture area was erased into "white", whereby no after-image was recognized. Referring to FIG. 23, at $S_N$, $S_{N+1}$ and $S_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_0$=5-8 volts and $\Delta T$=20-70 μsec.

The chiral smectic liquid crystal in this Example was in C1 alignment state in substantially the entire area (at least 99%) of the effective display region.

EXAMPLES 8-54

Liquid crystal cells were prepared in the same manner as in Example 7 except that the alignment control films (in terms of precursor polyamide acids represented by the formulas) and liquid crystal materials shown in Table 9 below.

The respective cells were tested in the same manner as in Example 7, whereby measured data of contrast ratio and delay time in optical response shown in Table 10 appearing hereinafter were obtained.

The respective cells were subjected to the multiplexing drive for display in the same manner as in Example 7, whereby similar results were attained with respect to contrast and after-image.

TABLE 9

| Example | Alignment film (precursor polyamide acid) | Liquid crystal material |
|---------|-------------------------------------------|-------------------------|
| 8 | Polymer with -HN-C(=O)- linked to benzene ring (COOH, CF₃ substituents), connected via C(=O) to another benzene (CF₃, HOOC), with -C(=O)-NH- to phenyl-O-phenyl group (n = 700–2000) | "CS1014" (trade name) (FLC, Chisso K.K.) |
| 9 | Similar polymer with additional CF₃ substituents on central benzene rings (n = 700–2000) | " |
| 10 | Similar structure (n = 700–2000) | " |
| 11 | Similar structure (n = 700–2000) | Liquid crystal material (3) described hereinbefore |

TABLE 9-continued

| Example | Alignment film (precursor polyamide acid) | Liquid crystal material |
|---|---|---|
| 12 | Polymer structure with bis(trifluoromethyl) benzene diamide linked to biphenyl ether, (n = 700–2000) | Liquid crystal material (3) described hereinbefore |
| 13 | Polymer structure with mono-CF₃ benzene diamide linked to biphenyl ether, (n = 700–2000) | "CS-1014" (trade name) (FLC, Chisso K.K.) |
| 14 | Polymer structure with mono-CF₃ benzene diamide linked to phenyl, (n = 700–2000) | " |
| 15 | Polymer structure with bis-CF₃ benzene diamide linked to biphenyl ether, (n = 700–2000) | " |

TABLE 9-continued

| Example | Alignment film (precursor polyamide acid) | Liquid crystal material |
|---|---|---|
| 16 | polymer structure with -HN-C(=O)-C6H(CF3)2-C(=O)-NH-C6H4- repeating unit, with COOH and HOOC substituents (n = 700–2000) | "CS-1014" (trade name) (FLC, Chisso K.K.) |
| 17 | " | Liquid crystal material (3) |
| 18 | polymer structure with -HN-C(=O)-C6H(CF3)2-C(=O)-NH-C6H4-O-C6H4-C(CH3)2- repeating unit, with COOH and HOOC substituents (n = 700–2000) | " |
| 19 | polymer structure with -HN-C(=O)-C6H2(CF3)-C6H2(CF3)-C(=O)-NH-C6H4-O-C6H4- repeating unit, with COOH and HOOC substituents (n = 700–2000) | "CS-1014" (trade name) (FLC, Chisso K.K.) |
| 20 | polymer structure with -HN-C(=O)-C6H2(CF3)-C6H2(CF3)-C(=O)-NH-C6H4-C(CH3)2- repeating unit, with COOH and HOOC substituents (n = 700–2000) | "CS-1014" (trade name) (FLC, Chisso, K.K.) |

TABLE 9-continued

| Example | Alignment film (precursor polyamide acid) | Liquid crystal material |
|---|---|---|
| 21 | [structure with biphenyl, CF$_3$ groups, COOH, NH-C(=O), phenoxy-phenyl] (n = 700-2000) | " |
| 22 | [structure with biphenyl, CF$_3$ groups, COOH, NH-C(=O), phenyl-NH] (n = 700-2000) | " |
| 23 | [structure with single phenyl, CF$_3$ groups, COOH, NH-C(=O), phenoxy-phenyl] (n = 700-2000) | Liquid crystal material (3) |
| 24 | " | Liquid crystal material (3) |
| 25 | [structure with phenyl-O-phenyl, CF$_3$ groups, COOH, NH-C(=O), phenoxy-phenyl] (n = 700-2000) | "CS-1014" (trade name) (FLC, Chisso, K.K.) |

TABLE 9-continued

| Example | Alignment film (precursor polyamide acid) | Liquid crystal material |
|---|---|---|
| 26 | polymer structure with -HN-C(=O)-Ar(CF₃)(COOH)-O-Ar(CF₃)- -NH-C(=O)- backbone with pendant p-phenyl (n = 700–2000) | " |
| 27 | polymer with -HN-C(=O)-Ar(CF₃)₂(COOH)-O-Ar(CF₃)₂- -NH-C(=O)- backbone with pendant p-phenyl-O-phenyl (n = 700–2000) | " |
| 28 | polymer with -HN-C(=O)-Ar(CF₃)₂(COOH)-O-Ar(CF₃)₂- -NH-C(=O)- backbone with pendant p-phenyl (n = 700–2000) | "CS-1014" (trade name) (FLC, Chisso K.K.) |
| 29 | " | Liquid crystal material (3) |
| 30 | polymer with -HN-C(=O)-Ar(CF₃)₂(COOH)-O-Ar(CF₃)₂- -NH-C(=O)- backbone with pendant p-phenyl-O-phenyl (n = 700–2000) | " |

TABLE 9-continued

| Example | Alignment film (precursor polyamide acid) | Liquid crystal material |
|---|---|---|
| 31 | polymer structure with HOOC, NH, C=O, CF₃ groups, biphenyl and phenoxy linkages (n = 700–2000) | "CS-1014" (trade name) (FLC, Chisso K.K.) |
| 32 | polymer structure with HOOC, NH, C=O, CF₃, COOH groups (n = 700–2000) | "CS-1014" (trade name) (FLC, Chisso K.K.) |
| 33 | polymer structure with HOOC, NH, C=O, CF₃, COOH groups (n = 700–2000) | " |
| 34 | polymer structure with HOOC, NH, C=O, CF₃ groups (n = 700–2000) | " |
| 35 | " | Liquid crystal material (3) |

TABLE 9-continued

| Example | Alignment film (precursor polyamide acid) | Liquid crystal material |
|---------|-------------------------------------------|-------------------------|
| 36 | (structure shown, n = 700–2000) | Liquid crystal material (3) |
| 37 | (structure shown, n = 700–2000) | "CS-1014" (trade name) (FLC, Chisso K.K.) |
| 38 | (structure shown, n = 700–2000) | " |
| 39 | (structure shown, n = 700–2000) | " |

TABLE 9-continued
| Example | Alignment film (precursor polyamide acid) | Liquid crystal material |
|---|---|---|
| 40 | 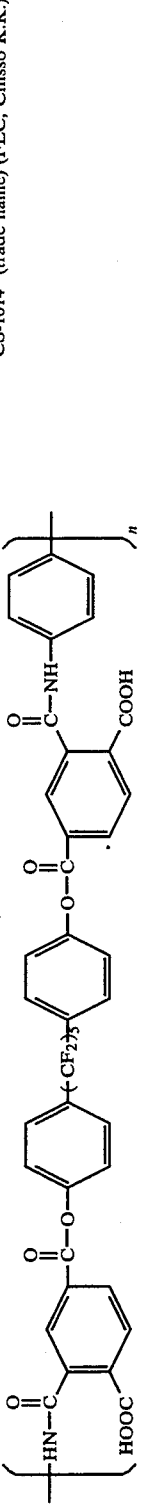 (n = 700-2000) | "CS-1014" (trade name) (FLC, Chisso K.K.) |
| 41 | " | Liquid crystal material (3) |
| 42 | 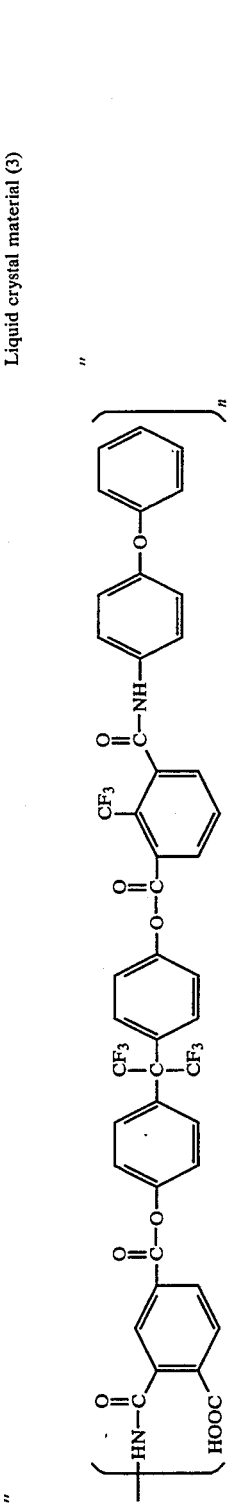 (n = 700-2000) | " |
| 43 | 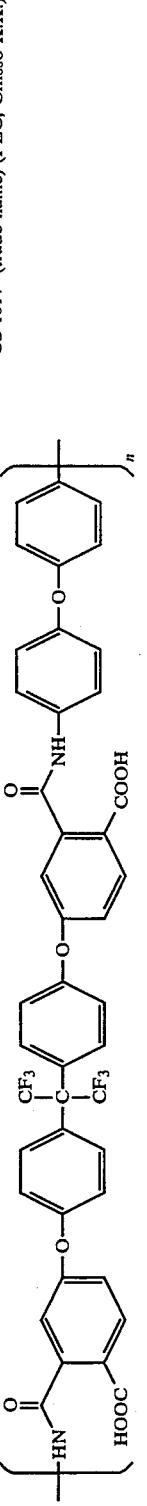 (n = 700-2000) | "CS-1014" (trade name) (FLC, Chisso K.K.) |
| 44 | 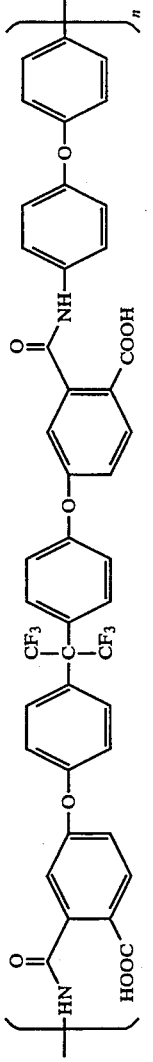 (n = 700-2000) | "CS-1014" (trade name) (FLC, Chisso K.K.) |

TABLE 9-continued

| Example | Alignment film (precursor polyamide acid) | Liquid crystal material |
|---|---|---|
| 45 | structure with $-(CF_3)_3C-O-C(CF_3)_3-$ linker, $n = 700-2000$ | " |
| 46 | structure with $-(CF_2)_3-$ linker, $n = 700-2000$ | " |
| 47 | structure with $-(CF_2)_5-$ linker and $CF_3$ substituents, $n = 700-2000$ | Liquid crystal material (3) |
| 48 | structure with $-C(CF_3)_2-$ linker and $CH_3$ substituents, $n = 700-2000$ | Liquid crystal material (3) |

TABLE 9-continued

| Example | Alignment film (precursor polyamide acid) | Liquid crystal material |
|---|---|---|
| 49 | Polymer with repeat unit containing phenyl-O-phenyl(CF₃)(CF₃)-O-phenyl-C(=O)NH- and -HN(O=)C- groups with COOH and HOOC substituents (n = 700-2000) | "CS-1014" (trade name) (FLC, Chisso K.K.) |
| 50 | Polymer with repeat unit containing phenyl-O-phenyl(CF₃)-O-phenyl-C(=O)NH- and -HN(O=)C- groups with COOH and HOOC substituents (n = 700-2000) | " |
| 51 | Polymer with repeat unit containing phenyl-O-phenyl(CF₃)(CF₃)-O-phenyl-C(=O)NH- and -HN(O=)C- groups with COOH and HOOC substituents (n = 700-2000) | " |
| 52 | Polymer with repeat unit containing phenyl-O-phenyl(CF₃)-O-phenyl(CF₃)-C(=O)NH- and -HN(O=)C- groups with COOH, CF₃ and HOOC substituents (n = 700-2000) | "CS-1014" (trade name) (FLC, Chisso K.K.) |
| 53 | " | Liquid crystal material (3) |

TABLE 9-continued
| Example | Alignment film (precursor polyamide acid) | Liquid crystal material |
|---|---|---|
| 54 |  (n = 700-2000) | " |

TABLE 10

| Example | Contrast ratio | Delay in optical response (sec) |
|---|---|---|
| 8 | 47:1 | 0.2 |
| 9 | 50:1 | 0.1 |
| 10 | 43:1 | 0.2 |
| 11 | 38:1 | 0.2 |
| 12 | 42:1 | 0.1 |
| 13 | 55:1 | 0.2 |
| 14 | 50:1 | 0.1 |
| 15 | 51:1 | 0.1 |
| 16 | 53:1 | 0.2 |
| 17 | 45:1 | 0.1 |
| 18 | 30:1 | 0.1 |
| 19 | 50:1 | 0.2 |
| 20 | 40:1 | 0.1 |
| 21 | 51:1 | 0.2 |
| 22 | 55:1 | 0.2 |
| 23 | 42:1 | 0.3 |
| 24 | 35:1 | 0.1 |
| 25 | 50:1 | 0.2 |
| 26 | 40:1 | 0.3 |
| 27 | 50:1 | 0.1 |
| 28 | 35:1 | 0.3 |
| 29 | 30:1 | 0.2 |
| 30 | 37:1 | 0.1 |
| 31 | 40:1 | 0.2 |
| 32 | 35:1 | 0.3 |
| 33 | 46:1 | 0.1 |
| 34 | 27:1 | 0.1 |
| 35 | 50:1 | 0.2 |
| 36 | 37:1 | 0.1 |
| 37 | 45:1 | 0.2 |
| 38 | 47:1 | 0.2 |
| 39 | 58:1 | 0.4 |
| 40 | 40:1 | 0.2 |
| 41 | 39:1 | 0.2 |
| 42 | 44:1 | 0.3 |
| 43 | 30:1 | 0.2 |
| 44 | 20:1 | 0.2 |
| 45 | 25:1 | 0.1 |
| 46 | 21:1 | 0.2 |
| 47 | 30:1 | 0.2 |
| 48 | 27:1 | 0.1 |
| 49 | 50:1 | 0.2 |
| 50 | 45:1 | 0.3 |
| 51 | 36:1 | 0.1 |
| 52 | 40:1 | 0.1 |
| 53 | 40:1 | 0.2 |
| 54 | 25:1 | 0.4 |

In any of the above Examples, the chiral smectic liquid crystal was in C1 alignment state in an areal proportion of at least 95% of the effective display region.

Comparative Examples 7-10

Liquid crystal cells were prepared in the same manner as in Example 7 except that the alignment control film (in terms of commercially available precursor polyamide acid varnish, the degree of polymerization being each in the range of 700-2000) and liquid crystal materials shows in Table 11 below. The measured data of contrast ratio and delay in optical response measured for each of the cells are shown in Table 12 below.

The respective cells were subjected to the multiplexing drive for display in the same manner as in Example 7, whereby the resultant contrasts were smaller than that given by Example 7 and after-image was recognized for each cell.

In any of the Comparative Examples, the chiral smectic liquid crystal was in C1 alignment state in an areal proportion of at most 90% of the effective display region.

TABLE 11

| Comparative Example | Alignment film (polyamide acid varnish) | Liquid crystal material |
|---|---|---|
| 7 | "SP-710" (trade name) (aromatic polyimide varnish, Toray K.K.) | "CS-1014" (trade name) (FLC, Chisso K.K.) |
| 8 | "SP-710" (trade name) (aromatic polyimide varnish, Toray K.K.) | Liquid crystal material (3) described hereinbefore |
| 9 | "LQ-5200" (trade name) (polyimide varnish, Hitachi Kasei K.K.) | "CS-1014" |
| 10 | "LQ-5200" (trade name) (polyimide varnish, Hitachi Kasei K.K.) | Liquid crystal material (3) |

TABLE 12

| Comp. Example | Contrast ratio | Delay in optical response (sec) |
|---|---|---|
| 7 | 8:1 | 1.5 |
| 8 | 7:1 | 2.5 |
| 9 | 10:1 | 1.2 |
| 10 | 8:1 | 2.2 |

EXAMPLES 55-102

Liquid crystal cells were prepared in the same manner as in Example 7-54, respectively, except that a pair of substrates for each cell were disposed so that their rubbing axes intersected each other at a counter-clockwise intersection angle of −6 degrees as shown in FIG. 1B.

The respective cells prepared above were tested in the same manner as in Examples 7-54, respectively, whereby measured data shown in Table 13 below were obtained, showing remarkably improved contrast ratios compared with the corresponding cells of Examples 7-54.

TABLE 13

| Example | Polyimide | Contrast ratio | Delay in optical response (sec) |
|---|---|---|---|
| 55 | Same as Ex. 7 | 51:1 | 0.2 |
| 56 | Same as Ex. 8 | 49:1 | 0.2 |
| 57 | Same as Ex. 9 | 61:1 | 0.2 |
| 58 | Same as Ex. 10 | 45:1 | 0.1 |
| 59 | Same as Ex. 11 | 44:1 | 0.2 |
| 60 | Same as Ex. 12 | 51:1 | 0.1 |
| 61 | Same as Ex. 13 | 57:1 | 0.2 |
| 62 | Same as Ex. 14 | 59:1 | 0.1 |
| 63 | Same as Ex. 15 | 58:1 | 0.1 |
| 64 | Same as Ex. 16 | 55:1 | 0.2 |
| 65 | Same as Ex. 17 | 53:1 | 0.1 |
| 66 | Same as Ex. 18 | 41:1 | 0.1 |
| 67 | Same as Ex. 19 | 50:1 | 0.2 |
| 68 | Same as Ex. 20 | 41:1 | 0.1 |
| 69 | Same as Ex. 21 | 51:1 | 0.2 |
| 70 | Same as Ex. 22 | 58:1 | 0.2 |
| 71 | Same as Ex. 23 | 45:1 | 0.2 |
| 72 | Same as Ex. 24 | 49:1 | 0.1 |
| 73 | Same as Ex. 25 | 51:1 | 0.2 |
| 74 | Same as Ex. 26 | 49:1 | 0.1 |
| 75 | Same as Ex. 27 | 51:1 | 0.1 |
| 76 | Same as Ex. 28 | 39:1 | 0.1 |
| 77 | Same as Ex. 29 | 40:1 | 0.1 |
| 78 | Same as Ex. 30 | 48:1 | 0.1 |
| 79 | Same as Ex. 31 | 51:1 | 0.2 |
| 80 | Same as Ex. 32 | 42:1 | 0.2 |
| 81 | Same as Ex. 33 | 59:1 | 0.2 |
| 82 | Same as Ex. 34 | 39:1 | 0.1 |

TABLE 13-continued

| Example | Polyimide | Contrast ratio | Delay in optical response (sec) |
|---|---|---|---|
| 83 | Same as Ex. 35 | 51:1 | 0.2 |
| 84 | Same as Ex. 36 | 42:1 | 0.1 |
| 85 | Same as Ex. 37 | 49:1 | 0.2 |
| 86 | Same as Ex. 38 | 52:1 | 0.4 |
| 87 | Same as Ex. 39 | 59:1 | 0.4 |
| 88 | Same as Ex. 40 | 42:1 | 0.2 |
| 89 | Same as Ex. 41 | 47:1 | 0.2 |
| 90 | Same as Ex. 42 | 54:1 | 0.2 |
| 91 | Same as Ex. 43 | 42:1 | 0.2 |
| 92 | Same as Ex. 44 | 39:1 | 0.2 |
| 93 | Same as Ex. 45 | 40:1 | 0.2 |
| 94 | Same as Ex. 46 | 42:1 | 0.2 |
| 95 | Same as Ex. 47 | 40:1 | 0.2 |
| 96 | Same as Ex. 48 | 38:1 | 0.1 |
| 97 | Same as Ex. 49 | 51:1 | 0.2 |
| 98 | Same as Ex. 50 | 45:1 | 0.2 |
| 99 | Same as Ex. 51 | 49:1 | 0.1 |
| 100 | Same as Ex. 52 | 49:1 | 0.1 |
| 101 | Same as Ex. 53 | 50:1 | 0.2 |
| 102 | Same as Ex. 54 | 35:1 | 0.2 |

In any of the above Examples, the chiral smectic liquid crystal was in C1 alignment state in an areal proportion of at least 95% of the effective display region.

Comparative Examples 11-14

Liquid crystal cells were prepared by using materials shown in Table 14 below in the same manner as in Comparative Example 7-10, respectively, except that a pair of substrates for each cell were disposed so that their rubbing axes intersected each other at a counter-clockwise intersection angle of −6 degrees as shown in FIG. 1B.

The respective cells prepared above were tested in the same manner as in Comparative Examples 7-10, respectively, whereby measured data shown in Table 15 below were obtained.

In any of the Comparative Examples, the chiral smectic liquid crystal was in C1 alignment state in an areal proportion of at most 90% of the effective display region.

TABLE 14

| Comparative Example | Alignment film (polyamide acid varnish) | Liquid crystal material |
|---|---|---|
| 11 | "SP-710" (trade name) (aromatic polyimide varnish, Toray K.K.) | "CS-1014" (trade name) (FLC, Chisso K.K.) |
| 12 | "SP-710" (trade name) (aromatic polyimide varnish, Toray K.K.) | Liquid crystal material (3) described hereinbefore |
| 13 | "LQ-5200" (trade name) (polyimide varnish, Hitachi Kasei K.K.) | "CS-1014" |
| 14 | "LQ-5200" (trade name) (polyimide varnish, Hitachi Kasei K.K.) | Liquid crystal material (3) |

TABLE 15

| Comp. Example | Contrast ratio | Delay in optical response (sec) |
|---|---|---|
| 11 | 9:1 | 1.5 |
| 12 | 7:1 | 2.5 |
| 13 | 11:1 | 1.2 |
| 14 | 7:1 | 2.2 |

As is apparent from the above Examples and Comparative Examples, according to the present invention, there is obtained a liquid crystal device which provides a high-quality display including a high contrast between the bright and dark states, particularly a very large display contrast at the time of multiplexing drive and is free from ugly after-image.

What is claimed is:

1. A liquid crystal device having an effective display region, comprising:
   a pair of substrates,
   an alignment film comprising a polyimide which has a fluorine-containing substituent in its carboxylic acid-originated moiety, disposed on at least one of said pair of substrates and subjected to a rubbing aligning treatment so that a chiral smectic liquid crystal molecule is pre-tilted at an angle of 8°-30° with respect to the surface of said alignment film, and
   said chiral smectic liquid crystal being disposed between the pair of substrates in an alignment state where its helical structure is suppressed; said chiral smectic liquid crystal forming an aligned region occupying an area which is at least 95% of the effective display region, said aligned region including a plurality of unidirectionally bent layers each organized by plural liquid crystal molecules in chiral smectic phase.

2. A liquid crystal device according to claim 1, wherein said area is at least 98% of the effective display region.

3. A liquid crystal device according to claim 1, wherein said area is at least 99% of the effective display region.

4. A liquid crystal device having an effective display region, comprising:
   a pair of substrates,
   a pair of alignment films comprising a polyimide which has a fluorine-containing substituent in its carboxylic acid-originated moiety, respectively disposed on said pair of substrates and subjected to a rubbing aligning treatment so that a chiral smectic liquid crystal molecule is pre-tilted at an angle of 8°-30° with respect to the surface of said alignment film, and
   said chiral smectic liquid crystal being disposed between the pair of substrates in an alignment state where its helical structure is suppressed; said chiral smectic liquid crystal forming an aligned region occupying an area which is at least 95% of the effective display region, said aligned region including a plurality of unidirectionally bent layers each organized by plural liquid crystal molecules in chiral smectic phase and including liquid crystal molecules which are inclined at mutually opposite inclination sense in the vicinity of the alignment film surfaces.

5. A liquid crystal device according to claim 4, wherein said area is at least 98% of the effective display region.

6. A liquid crystal device according to claim 4, wherein said area is at least 99% of the effective display region.

7. A liquid crystal device having an effective display region, comprising:
   a pair of substrates,
   a pair of alignment films comprising a polyimide which has a fluorine-containing substituent in its carboxylic acid-originated moiety, respectively disposed on said pair of substrates and subjected to a rubbing aligning treatment so that a chiral smectic liquid crystal molecule is pre-tilted at an angle of 8°–30° with respect to the surface of said alignment film, and
   said chiral smectic liquid crystal being disposed between the pair of substrates in an alignment state where its helical structure is suppressed; said chiral smectic liquid crystal forming an aligned region occupying an area which is at least 95% of the effective display region, said aligned region including a plurality of layers each organized by plural liquid crystal molecules including liquid crystal molecules which are inclined at mutually opposite inclination sense in the vicinity of the alignment film surfaces, the layers being inclined at an angle of at least 95 degrees in the same rotational sense as the inclinations of the liquid crystal molecules in the vicinity of the alignment film surfaces so that the layers are unidirectionally bent corresponding to the inclinations the layers.

8. A liquid crystal device according to claim 7, wherein said area is at least 98% of the effective display region.

9. A liquid crystal device according to claim 7, wherein said area is at least 99% of the effective display region.

* * * * *

UNITED STATES PATENT AND TRADEMARK OFFICE
CERTIFICATE OF CORRECTION

PATENT NO. : 5,422,749

DATED : June 6, 1995

INVENTOR(S) : Yukio Hanyu, et al

Page 1 of 4

It is certified that error appears in the above-indentified patent and that said Letters Patent is hereby corrected as shown below:

TITLE PAGE:

[54] Title

"SMETIC" should read --SMECTIC--.

COLUMN 1

Line 2, "SMETIC" should read --SMECTIC--.

COLUMN 4

Line 50, "temperatures;" should read --temperature;--; and

Line 67, "a projections" should read --projections--.

COLUMN 6

Line 33, "shows" should read --show--; and

Line 43, "allcyclic" should read --alicyclic--.

COLUMN 7

Line 1, "phase phase" should read --phase--;

Line 22, "domain" should read --domain 20,--;

Line 46, "negligible except" should read --negligible amount excepting--; and

Line 51, "FIGS. 3-5)." should read --FIGS. 3-5.--.

COLUMN 10

Line 10, "c1 alignment" should read --C1 alignment--.

UNITED STATES PATENT AND TRADEMARK OFFICE
CERTIFICATE OF CORRECTION

PATENT NO. : 5,422,749

DATED : June 6, 1995

INVENTOR(S) : Yukio Hanyu, et al

It is certified that error appears in the above-indentified patent and that said Letters Patent is hereby corrected as shown below:

COLUMN 15

Line 58, "Cm*C2" should read --Sm*C2--.

COLUMN 18

Line 65,

"$\begin{array}{c}CF_3\\|\\-C-\\|\\CF_3\end{array}$ or" should read --$\begin{array}{c}CF_3\\|\\-C-\\|\\C_2F_5\end{array}$ or--.

COLUMN 21

Form. III-(3), "5, 5'-difluor-3,3'," should read --5, 5'-difluoro-3,3',--.

COLUMN 23

Line 20, "polyinides" should read --polyimides--.

COLUMN 25

Form. VI-(5) " [structure] " should read -- [structure with CF3] --; and

UNITED STATES PATENT AND TRADEMARK OFFICE
CERTIFICATE OF CORRECTION

PATENT NO. : 5,422,749
DATED : June 6, 1995
INVENTOR(S) : Yukio Hanyu, et al

It is certified that error appears in the above-indentified patent and that said Letters Patent is hereby corrected as shown below:

COLUMN 25, Cont'd.

Form. VI-(9) "[4-(3, 4-dicarboxybenxyloxy)phenyl]-" should read --[4-(3,4-dicarboxybenzoyloxy)phenyl]- --.

COLUMN 29

Form. VII-(11), "(3, 4-dicarboxy-2-drifluoro-methylphenoxy)" should read --(3, 4-dicarboxy-2-trifluoro-methylphenoxy)--.

COLUMN 33

Line 11, "p-phenylenedie-" should read --p-phenylenedia--.

COLUMN 34

Line 14, "0.8 82" should read --0.8 $\mu$m--;

Line 15, "m" should be deleted; and

Line 54, "FIG. 18nA" should read --FIG. 18A--.

COLUMN 49

Example 32, "Chiosso K.K.)" should read --Chisso K.K.)--.

UNITED STATES PATENT AND TRADEMARK OFFICE
CERTIFICATE OF CORRECTION

PATENT NO. : 5,422,749
DATED : June 6, 1995
INVENTOR(S) : Yukio Hanyu, et al

It is certified that error appears in the above-indentified patent and that said Letters Patent is hereby corrected as shown below:

COLUMN 55

Example 45, 
$$\text{"}\begin{array}{c} CF_3 \\ | \\ -O- \\ | \\ CF_3 \\ | \\ CF_3 \end{array}\text{"} \quad \text{should read} \quad \begin{array}{c} --CF_3-- \\ | \\ -O- \\ | \\ CF_2 \\ | \\ CF_3 \end{array}$$

COLUMN 66

Line 11, "inclinations" should read --inclinations of--.

DRAWING SHEET 18

Fig. 24, "ADORESS" should read --ADDRESS--.

Signed and Sealed this

Fourteenth Day of November, 1995

Attest:

BRUCE LEHMAN

Attesting Officer

Commissioner of Patents and Trademarks